US008132406B2

(12) United States Patent  
Thompson, Jr.

(10) Patent No.: US 8,132,406 B2
(45) Date of Patent: Mar. 13, 2012

(54) TIDE ACTIVATED DEVICE TO OPERATE A TURBINE GENERATOR

(76) Inventor: Randall Thompson, Jr., Lincoln, MA (US)

( * ) Notice: Subject to any disclaimer, the term of this patent is extended or adjusted under 35 U.S.C. 154(b) by 210 days.

(21) Appl. No.: 12/395,978

(22) Filed: Mar. 2, 2009

(65) Prior Publication Data

US 2010/0219639 A1    Sep. 2, 2010

(51) Int. Cl.
*F03C 1/00* (2006.01)
(52) U.S. Cl. ............... 60/496; 60/499; 60/503; 60/507; 290/42; 290/53
(58) Field of Classification Search ............ 60/497–499, 60/502–503, 507; 290/42, 53
See application file for complete search history.

(56) References Cited

U.S. PATENT DOCUMENTS

| | | | |
|---|---|---|---|
| 3,487,228 A * | 12/1969 | Kriegel | 290/52 |
| 3,706,507 A | 12/1972 | Dunbar | |
| 3,964,264 A * | 6/1976 | Tornabene | 405/76 |
| 3,988,592 A * | 10/1976 | Porter | 290/53 |
| 4,009,395 A | 2/1977 | Long et al. | |
| 4,293,050 A | 10/1981 | Goloff et al. | |
| 4,434,375 A | 2/1984 | Taylor | |
| 4,541,242 A | 9/1985 | Thompson, Jr. | |
| 4,598,211 A * | 7/1986 | Koruthu | 290/53 |
| 4,610,140 A | 9/1986 | Thompson, Jr. | |
| 4,612,768 A | 9/1986 | Thompson, Jr. | |
| 4,622,812 A | 11/1986 | Thompson, Jr. et al. | |
| 5,329,229 A * | 7/1994 | Chiba et al. | 324/248 |
| 5,424,582 A * | 6/1995 | Trepl et al. | 290/53 |
| 5,929,531 A | 7/1999 | Lagno | |
| 6,800,954 B1 * | 10/2004 | Meano | 290/53 |
| 6,812,588 B1 * | 11/2004 | Zadig | 290/53 |
| 6,930,406 B2 | 8/2005 | Montgomery | |
| 2006/0150625 A1 | 7/2006 | Behrens | |

OTHER PUBLICATIONS

Carter, Wave Energy Converters and a Submerged Horizontal Plate. Ocean and Resource Engineering, University of Hawaii [Purportedly retrieved on Apr. 7, 2010] Retrieved from the Internet : <URL:http://www.soest.hawaii.edu/ore/faculty/ertekin/Thesis$_{13}$ Paper__Dissertation/richard__carter-ms-thesis.pdf>pp. 1 -273.

* cited by examiner

*Primary Examiner* — Hoang Nguyen
(74) *Attorney, Agent, or Firm* — Paul C. Remus; Kimberly A. W. Peaslee; Devine, Millimet & Branch, P.A.

(57) ABSTRACT

A tide activated power system has a plurality of horizontally oriented cylinders that each have a pair of chambers. The cylinders are carried on float/weight barges that are located in a lagoon. A plurality of float/weight barges each have at least two cylinders in series. Each cylinder has a chamber holding a piston movable in the chamber defining a pair of variable size chambers: a flood variable size chamber and an ebb variable size chamber. As the float/weight barge rises and falls on the tide in the lagoon, the variable size chambers vary in size and force a working fluid to a turbine generator to create electrical energy. The piston of each of the multiple cylinders of the multiple barges forces combined to move the working fluid above the turbine generator where the flow drives the turbine generator prior to returning to the cylinder. In alternative embodiments, other mechanisms convert the energy from the rising and falling of the flow/weight barges to a non-uniform motion in one direction. The system can accumulate energy from the mechanism for converting the motion and converts the accumulating energy to another form of energy.

27 Claims, 26 Drawing Sheets

TIDE ACTIVATED DEVICE TO OPERATE A TURBINE GENERATOR

TECHNICAL FIELD

The present invention relates to tide activated energy generation devices and systems, and more particularly, to a tide activated system that has a horizontal pumping device to elevate fresh water for operating a turbine generator.

BACKGROUND INFORMATION

Various apparatus and systems have attempted to generate and store power through the use of the motion of the tide or other periodic rising and falling of a body of water. One set of systems uses the horizontal flow of the wave power to rotate a generator. Another set of systems uses the vertical movement of the tide to generate power. In this second system for generating power or energy from the rise and fall of a body of water, i.e. —due to tidal movement, it is desirable to have a means for storing energy at peak periods of generation for use during periods when demand exceeds generation, i.e. at slack tide, in order that a continuous flow of energy can be provided.

One method is the use of weights that are lifted to store energy when power generation exceeds demand, and allowed to drop to generate extra power when demand exceeds the rate of power generation from the fluid level dependent system. Another method of deriving energy from the rise and fall of a body of water consists of a float adapted to move substantially in a vertical plane in response to the rise and fall of the body of water. A cylinder has a piston adapted for vertical movement relative to the cylinder in response to the rise and fall of the float with the body of water, in a manner to apply force to fluid in a chamber of the cylinder, the force being applied alternately to opposed chambers of the cylinder, means for converting force applied to the fluid to energy, and means responsive to energy demand for storing energy converted from force applied to the fluid and for converting stored energy to force applied to the fluid.

Unfortunately, there are deficiencies in traditional horizontally-oriented tide activated power systems including maintenance concerns due to significant seawater acting on the generator. Furthermore, conventional tide activated power systems are inefficient for at least one of numerous factors. These factors include inefficiencies in generating power from horizontal flow of the water that moves in both directions relative to the generator, coupling to cylinders at different heights, or the coupling of multiple smaller units for efficiency.

BRIEF SUMMARY OF THE INVENTION

In contrast to the above-described tide activated power systems, this tide activated power system has a plurality of horizontally-oriented cylinders that each have a pair of chambers. The cylinders are carried on float/weight barges that are located in a lagoon. Each float/weight barge has at least two cylinders in series. Each cylinder has a chamber holding a piston movable in the chamber defining a pair of variable size chambers: a flood variable size chamber and an ebb variable size chamber. As the float/weight barge rises and falls on the tide in the lagoon, the variable size chambers vary in size, and force a working fluid to the reservoir and then onto a turbine generator to create electrical energy. The piston of each of the multiple cylinders of the multiple barges forces combine to move the working fluid above the turbine generator to the reservoir where the flow of working fluid from the reservoir drives the turbine generator prior to returning to the cylinder via a sump. Furthermore, the system uses fresh water as the working fluid to minimize corrosion from salt in the body of water such as within the turbine generator. The system is more efficient than the prior systems in deriving energy from the motion of the tide.

In an embodiment of the tide activated system for deriving energy from the periodic rise and fall of the level of a body of water, the system has a float/weight barge having a cylinder, a shaft, a cable guide system, and a buoyancy and weight system. The float/weight barge rises and falls with the level of the body of water. The cylinder has a chamber. The chamber holds a piston movable in the chamber defining a pair of variable size chambers. The shaft extends through the chamber and connects to the piston for moving the piston within the chamber of the cylinder for varying the size of the pair of variable size chambers of the cylinder. The cable guide system has a series of pulleys. The buoyancy and weight system maintains stability of the float/weight barge as the float/weight barge rises and falls.

The tide activated system has a pumping cable system for interacting with at least a pair of pulleys of the cable guide system. The pumping cable system includes the shaft extending through the chamber, wherein the movement of the float/weight barge in the rising and falling water moves the piston in the cylinder, varying the size of the pair of variable size chambers. A turbine generator of the tide activated system has a working fluid input port, a working fluid output port, and a series of blades for interacting with the working fluid for converting the energy from the working fluid into another form of energy.

The tide activated system has a flow control system for directing working fluid forced from the variable size chamber that is decreasing in size as the barge rises or falls. The working fluid is forced towards the turbine generator via the reservoir. The system directs the working fluid from the turbine generator, in a preferred embodiment via the sump, to the variable size chamber that is increasing in size as the barge rises or falls. The rise and fall of the level of the body of water results in the rise and fall of the barge therein moving the piston back and forth in the cylinder forcing working fluid out of one side of the variable size chamber and then the other side of the variable size chamber. The side that is not having the working fluid forced out is being filled with working fluid.

In an embodiment of the tide activated system, the float/weight barge has at least two cylinders in series. Each chamber holds a piston movable in the chamber defining a pair of variable size chambers. The shaft extends through the chambers of each of the cylinders and is connected to the piston for moving the piston within the chamber of the cylinder for varying the size of the pair of variable size chambers of the cylinders.

In an embodiment, the tide activated system has a working fluid compensation system. The working fluid compensation system includes a reservoir, a sump, the turbine generator, the flow control system, and the variable size chambers. The reservoir retains the fluid from the cylinders and is located at a higher elevation than the turbine generator. The sump is at an elevation below the turbine generator and above the float/weight barge for holding for fluid from the turbine generator.

In an embodiment, the tide activated system has a lagoon in communication with the body of water by a channel. The lagoon has a perimeter sea wall enclosing the lagoon and a central sea wall positioned in the lagoon and connected to the perimeter sea wall by a causeway, wherein the central sea wall is interposed between the float/weight barge and the channel between the lagoon and the body of water.

The tide activated system in an embodiment has a plurality of float/weight barges carried in the lagoon for rising and falling with the level of the body of water. Each of the float/weight barges has at least one cylinder having a chamber. The chamber holds a piston movable in the chamber defining a pair of variable size chambers. In an embodiment, the float/weight barge has a cable guide system which has at least a pair of pulleys. The tide activated system further comprises a stabilizing cable system interacting with at least a pair of pulleys of the cable guide system, wherein the stabilizing cable system in cooperation with the pumping cable system maintains the float/weight barge in generally a horizontal plane as the float/weight barge rises and falls in the lagoon.

In an embodiment, the working fluid compensation system is a closed system and the working fluid is fresh water. In an embodiment, the turbine generator is for generating electrical energy In an embodiment of the tide activated system, the flow control system includes a series of pipes and check valves including a pair of chamber pipes. Each chamber pipe is connected to one of the pair of variable size chambers of the cylinder on the float/weight barge and to a first tee connection. A turbine input pipe, for the flow of the working fluid towards the turbine, has an end connected to a second tee connection. A turbine output pipe, for the flow of the working fluid from the turbine and an end is connected to a third tee connection.

Between one of the first tee connections and the second tee connection is a first connection pipe having a first check valve for allowing flow only from the variable size chamber to the turbine input pipe. Between one of the first tee connections and the third tee connection is a second connection pipe having a second check valve for allowing flow only from the turbine output pipe to the variable size chamber. Between the other of the first tee connection and the second tee connection is a third connection pipe having a third check valve for allowing flow only from the variable size chamber to the turbine input pipe. Between the other of the first tee connection and the third tee connection is a fourth connection pipe having a fourth check valve for allowing flow only from the turbine output pipe to the variable size chamber. Regardless of whether the level of the body of water is rising or falling, the flow control system directs flow from the variable size chambers to the working fluid input port of the turbine and flow from the working fluid output port of the turbine to the variable size chambers.

In an embodiment, fresh water is created to replenish losses. In an embodiment, the tide activated system includes a reverse osmosis separation process device powered by electrical energy from the turbine generator to create the fresh water to replenish losses.

In an embodiment, each of the pistons is separable-into a plurality of segments and each of the cylinders has at least one watertight access port through which the segments of the piston can pass for maintenance.

In accordance with another aspect of the present invention, a tide activated system for deriving energy from the periodic rise and fall of the level of a body of water has a lagoon in communication with the body of water by a channel. The lagoon has a perimeter sea wall enclosing the lagoon and a central sea wall positioned in the lagoon and connected to the perimeter sea wall by a causeway, wherein the central sea wall is interposed between the channel between the lagoon and the body of water and the float/weight barge. The system has a plurality of float/weight barges carried in the lagoon for rising and falling with the level of the body of the water.

Each of the float/weight barges has at least two cylinders in series. Each cylinder has a chamber. The chamber holds a piston movable in the chamber defining a pair of variable size chambers. A shaft extends through the chambers and is extending through and connected to the pistons for moving the pistons within the chamber of the respective cylinder for varying the size of the pair of variable size chambers of the at least two cylinders. Each barge has a cable guide system having a series of pulleys. Each barge has a buoyancy and weight system for maintaining stability of the float/weight barge as the float/weight barge rises and falls in the lagoon.

An outboard beam extends from the central sea wall to the perimeter sea wall. The outboard beam is parallel to the causeway wherein the float/weight barges are positioned between the outboard beam and the causeway. A pumping cable system extends between the causeway and the outboard beam and interacts with at least a pair of pulleys of the cable guide system. The pumping cable system includes the shaft extending through the chamber, wherein the movement of the float/weight barge in the rising and falling lagoon moves the piston in each of the cylinders varying the size of the pair of variable size chambers. A stabilizing cable system extends between the outboard beam and the causeway and interacts with at least a pair of pulleys of the cable guide system, wherein the stabilizing cable system in cooperation with the pumping cable system maintains the float/weight barge in generally a horizontal plane as the float/weight barge rises and falls in the lagoon;

The tide activated system has a working fluid compensation system including a reservoir, a turbine generator, a sump, and a flow control system. The reservoir for retaining the working fluid is located at a higher elevation than the lagoon. The turbine generator for generating electrical power is at an elevation below the reservoir and above the lagoon. The turbine generator has a working fluid input port, a working fluid output port, and a series of blades for interacting with the working fluid for converting the energy from the working fluid into electrical energy. The sump is at an elevation below the turbine generator and above the lagoon for holding working fluid from the turbine generator. The flow control system is for directing water forced from the variable size chamber that is decreasing in size as the barge rises or falls in the lagoon to the reservoir and is for directing water from the sump to the variable size chamber that is increasing in size as the barge rises or falls wherein the rise and fall of the level of the body of water results in the rise and fall of the barge therein moving the piston back and forth in the cylinder forcing fluid out of one side of the variable size chamber and then the other side of the variable size chamber as the other side is filled.

In an embodiment of the tide activated system, the flow control system includes a series of pipes and check valves including a pair of chamber pipes. Each chamber pipe is connected to one of the pair of variable size chambers of the cylinder on the float/weight barge and an end connected to a first tee connection. A reservoir input pipe is for the flow of the working fluid towards the reservoir and an end connected to a second tee connection. A sump output pipe is for the flow of the working fluid from the sump and an end connected to a third tee connection.

Between one of the first tee connections and the second tee connection is a first connection pipe having a first check valve for allowing flow only from the variable size chamber to the reservoir input pipe. Between one of the first tee connections and the third tee connection is a second connection pipe having a second check valve for allowing flow only from the sump output pipe to the variable size chamber. Between the other of the first tee connections and the second tee connection is a third connection pipe having a third check valve for allowing flow only from the variable size chamber to the reservoir input pipe. Between the other of the first tee connections and the third tee connection is a fourth connection pipe having a fourth check valve for allowing flow only from the sump output pipe to the variable size chamber wherein the flow is from the variable size chambers to the reservoir and the flow is from the sump to the variable size chambers regardless of whether the level of the body of water is rising or falling.

In an embodiment, the tide activated system for deriving energy from the periodic rise and fall of the level of a body of water includes a mechanism for rising and falling with the level of the body of water; a mechanism for converting the motion of the mechanism for rising and falling to a non-uniform motion in one direction; a mechanism for accumulating energy from the mechanism for converting the motion; and a mechanism for converting the accumulating energy to another form of energy. In an embodiment the mechanism for rising and falling with the level of the body of the water is at least one float/weight barge.

In an embodiment, each of the float/weight barges of the tide activated system has a cylinder having a chamber. The chamber holds a piston movable in the chamber defining a pair of variable size chambers. A shaft extends through the chamber. The shaft extends through and connects to the piston for moving the piston within the chamber of the cylinder for varying the size of the pair of variable size chambers of the cylinder. The system has a cable guide system having a series of pulleys. The float/weight barge has a buoyancy and weight system for maintaining stability of the float/weight barge as the float/weight barge rises and falls.

A pumping cable system interacts with at least a pair of pulleys of the cable guide system. The pumping cable system includes the shaft extending through the chamber, wherein the movement of the float/weight barge in the rising and falling water moves the piston in the cylinder varying the size of the pair of variable size chambers.

In an embodiment of the tide activated system, the mechanism for converting the accumulating energy to another form of energy is a turbine generator having a working fluid input port, a working fluid output port, and a series of blades for interacting with the working fluid for converting the energy from the working fluid into another form of energy. The mechanism for converting the motion of the float/weight barge to a non-steady or non-uniform motion in one direction is a flow control system for directing working fluid forced from the variable size chamber that is decreasing in size as the barge rises or falls towards the turbine generator and directing water from the turbine generator to the variable size chamber that is increasing in size as the barge rises or falls wherein the rise and fall of the level of the body of water results in the rise and fall of the barge therein moving the piston back and forth in the cylinder forcing fluid out of one side of the variable size chamber and then other side of the variable size chamber as the other side is filled.

In this embodiment, the mechanism for accumulating energy from the mechanism for converting the motion is a working fluid compensation system including a reservoir for retaining the fluid from the cylinders. The reservoir is located at a higher elevation than the turbine generator. A sump at an elevation below the turbine generator and above the float/weight barge for holding for fluid from the turbine generator is part of the mechanism for accumulating energy. The turbine generator is at an elevation below the reservoir and above the sump. In addition, the turbine generator, the flow control system, and the variable size chambers are part of the mechanism for accumulating energy.

In an embodiment of the tide activated system, the mechanism for converting the accumulating energy to another form of energy is a hydraulic motor coupled to a generator. The hydraulic motor has a working fluid input port, a working fluid output port, and a series of blades for interacting with the working fluid for converting the energy from the working fluid into another form of energy. The mechanism for converting the motion of the float/weight barge to a non-steady motion in one direction is a flow control system for directing working fluid forced from the variable size chamber that is decreasing in size as the barge rises or falls towards the hydraulic motor and directing water from the hydraulic motor to the variable size chamber that is increasing in size as the barge rises or falls. The rise and fall of the level of the body of water results in the rise and fall of the barge therein moving the piston back and forth in the cylinder forcing fluid out of one side of the variable size chamber and then other side of the variable size chamber as the other side is filled.

In this embodiment, the mechanism for accumulating energy from the mechanism for converting the motion is a working fluid compensation system including a pneumatic accumulator for retaining the working fluid from the cylinders at pressure. A check valve is interposed between the pneumatic accumulator and the flow control system. A sump is located at an elevation above the float/weight barge for holding for fluid from the hydraulic motor. In addition, the hydraulic motor, the flow control system, and the variable size chambers are part of the mechanism for accumulating energy.

In an embodiment of the tide activated system, the mechanism for converting the accumulating energy to another form of energy is a hydraulic motor coupled to a first transmission and a second transmission coupled to a generator. The hydraulic motor has a working fluid input port, a working fluid output port, and a series of blades for interacting with the working fluid for converting the energy from the working fluid into another form of energy. The mechanism for converting the motion of the float/weight barge to a non-steady motion in one direction is a flow control system for directing working fluid forced from the variable size chamber that is decreasing in size as the barge rises or falls towards the hydraulic motor and directing water from the hydraulic motor to the variable size chamber that is increasing in size as the barge rises or falls. The rise and fall of the level of the body of water results in the rise and fall of the barge therein moving the piston back and forth in the cylinder forcing fluid out of one side of the variable size chamber and then other side of the variable size chamber as the other side is filled.

In this embodiment, the mechanism for accumulating energy from the mechanism for converting the motion is a fly wheel system. The system includes a fly wheel, the hydraulic motor and a first transmission for inputting non-uniform motion from the working fluid into rotational kinetic energy in the fly wheel, and the second transmission and the generator for extracting uniform rotational kinetic energy in the fly wheel and converting it to another form of energy.

In an embodiment of the tide activated system, the mechanism for converting the accumulating energy to another form of energy is a hydraulic motor coupled to a first transmission and a second transmission coupled to a generator. The hydraulic motor has a working fluid input port, a working fluid output port, and a series of blades for interacting with the working fluid for converting the energy from the working fluid into another form of energy. The mechanism for converting the motion of the float/weight barge to a non-steady motion in one direction is a flow control system for directing working fluid forced from the variable size chamber that is decreasing in size as the barge rises or falls towards the hydraulic motor and directing water from the hydraulic motor to the variable size chamber that is increasing in size as the barge rises or falls. The rise and fall of the level of the body of water results in the rise and fall of the barge therein moving the piston back and forth in the cylinder forcing fluid out of one side of the variable size chamber and then other side of the variable size chamber as the other side is filled.

In this embodiment, the mechanism for accumulating energy from the mechanism for converting the motion is a dead weight system. The system includes a dead weight, a drum and a plurality of chains for carrying the dead weight, the hydraulic motor, and a first transmission for inputting non-uniform motion from the working fluid into potential energy in the dead weight by the drum and the plurality of chains, and the second transmission and the generator for extracting the potential energy from the dead weight and converting it to another form of energy.

In an embodiment of the tide activated system, the mechanism for converting the motion of the float/weight barge to a non-steady motion in one direction is a power drive system interacting with a mast on the float/weight barge therein rotating a drive pipe in the same direction whether the barge rises or falls. The rise and fall of the level of the body of water results in the rise and fall of the barge therein driving the drive pipe in a single direction.

In an embodiment, the mast has a rack. The power drive system includes a plate system, a drive gear, an ebbing tide gear, a reversing gear, and a flooding gear tide. The drive gear encircles the drive pipe and is rotatable relative to the plate system. The ebbing tide gear engages the rack. The reversing gear engages the rack. A retainer retains the ebbing tide gear and the reversing gear and allows rotation of each gear. The retainer moves in a translational direction relative to the plate system between an ebb position and a flood position. The flooding gear engages the drive gear and is rotatable relative to the plate system. During the flooding tide, the retainer slides upward relative to the plate system and the flooding tide gear engages the drive gear therein rotating the drive pipe. During the ebbing tide, the retainer slides downward relative to the plate system and the reversing gear engages the ebbing tide gear which is always engaging the drive gear therein rotating the drive pipe.

These aspects of the invention are not meant to be exclusive and other features, aspects, and advantages of the present invention will be readily apparent to those of ordinary skill in the art when read in conjunction with the following description, appended claims, and accompanying drawings.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

A tide activated power system has a plurality of horizontally oriented cylinders, each having a pair of chambers. The cylinders are carried on float/weight barges that are located in a lagoon. Each float/weight barge has at least two cylinders in series. Each cylinder has a chamber holding a piston movable in the chamber defining a pair of variable size chambers: a flood variable size chamber and an ebb variable size chamber.

As the float/weight barge rises and falls on the tide in the lagoon, the variable size chambers vary in size. The working fluid is forced to a turbine generator to create electrical energy. A reservoir is located between the float/weight barges and the turbine generator in a preferred embodiment to compensate for variations in flow rates during different portions of a tidal period and relative motion of the float/weight barge. A sump is located between the turbine generator and the float/weight barges in a preferred embodiment to compensate for variations in flow rates during different periods of a tidal cycle. The piston of each of the multiple cylinders of the multiple barges forces combine to move the working fluid above the turbine generator where the flow drives the turbine generator prior to returning to the cylinder.

An alternative tide activated power system that transfers the power from the movement of the float/weight barges from a vertically moving mast to a rotating shaft is described with respect to FIGS. 18-22B.

Figure 1:
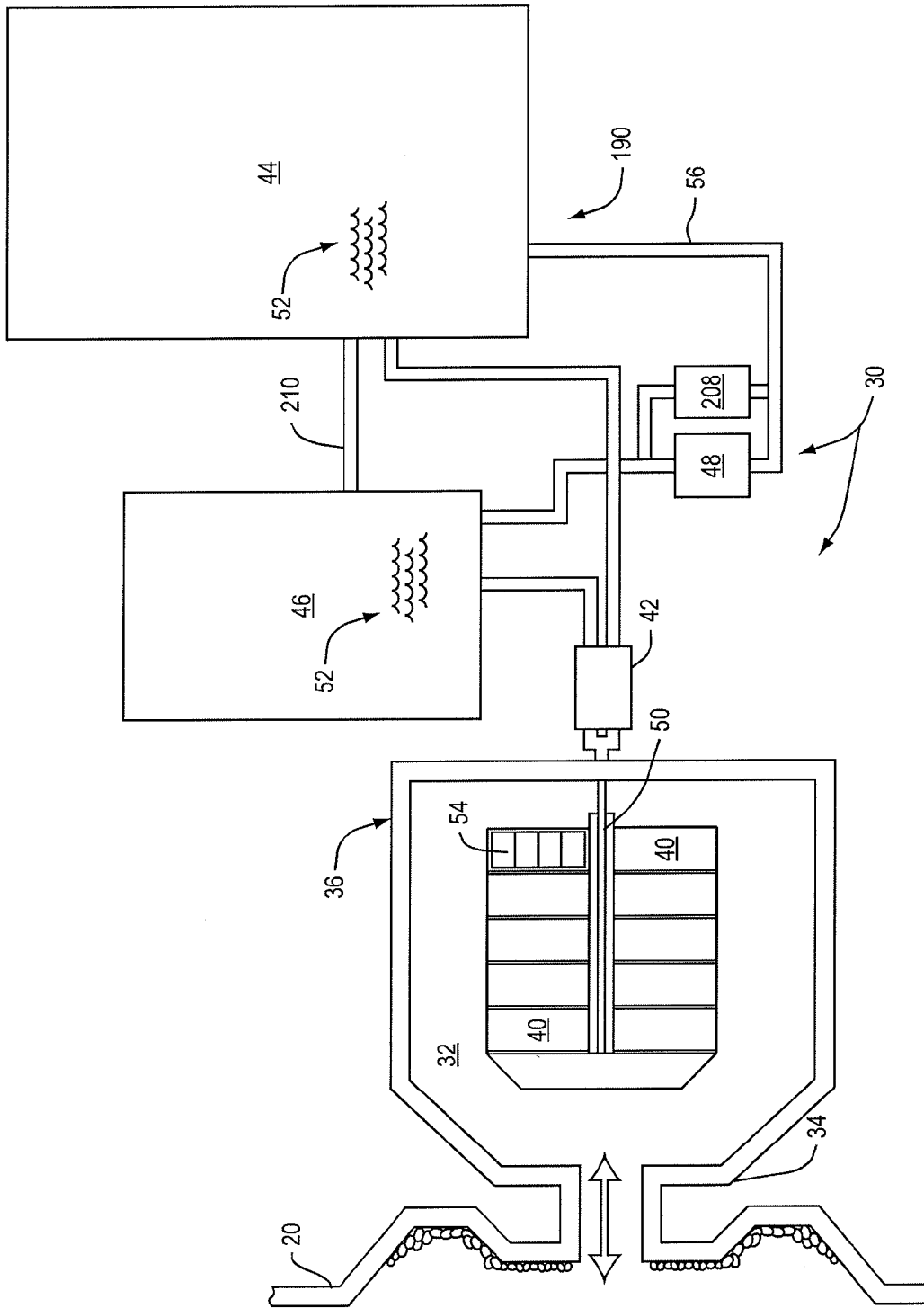
FIG. 1 is a schematic overview of the tide activated system of the present invention.

Referring to FIG. 1, a schematic overview of the tide activated system 30 is shown. The system 30 has a lagoon 32 in communication with a tidal body of water 20 such as an ocean or sea. The lagoon 32 is positioned such that it is in communication with the tidal body of water 20 through a channel 34. The lagoon 32 has a perimeter sea wall 36 that encircles the lagoon 32. The lagoon 32 is of such of depth that there is sufficient water in the lagoon 32 even at the lowest tide so that the float/weight barge 40 does not bottom out. In addition to the perimeter sea wall 36, the system 30 has a central sea wall 38 located in the lagoon 32.

Still referring to FIG. 1, in addition to the lagoon 32, the tide activated system 30 has a plurality of float/weight barges 40, a flow control system 42, a reservoir 44, a sump 46, and a turbine 48. The central sea wall 38 is positioned between the channel 34 to the lagoon 32 from the body of water 20 and the plurality of float/weight barges 40. The central sea wall 38 is connected to the perimeter sea wall 36 by a causeway 50.

The majority of the horizontal component of the tide will be eliminated by the shape of the wall in the body of water and the channel 34 from the body of the water to the lagoon. Furthermore the central sea wall 38, which is positioned between the channel 34 and the float/weight barges 40, reduces the horizontal component of the tide from acting on the float/weight barges 40. It is desirous to reduce if not eliminate any horizontal component of the wave in that it is not used to create energy in the tide activated system 30 and furthermore can adversely affect the vertical motion of the float/weight barges.

The tide activated system 30 has a working fluid 52, which is fresh water in a preferred embodiment, that moves among a plurality of cylinders 54 located on each of the float/weight barges 40, the flow control system 42, the reservoir 44, the turbine 48, the sump 46, back through the flow control system 42 and back to the plurality of cylinders 54. A series of pipes 56 are shown extending between the various components of the system 30.

The working fluid 52 is in a closed working fluid compensation system 190 that includes the reservoir 44 and the sump 46. As will become more evident from descriptions below, the rate at which the working fluid 52 moves is not constant in all components. The reservoir 44 and the sump 46 allow for the fluctuations in rates of the working fluid being forced from the cylinders 54.

Figure 2:
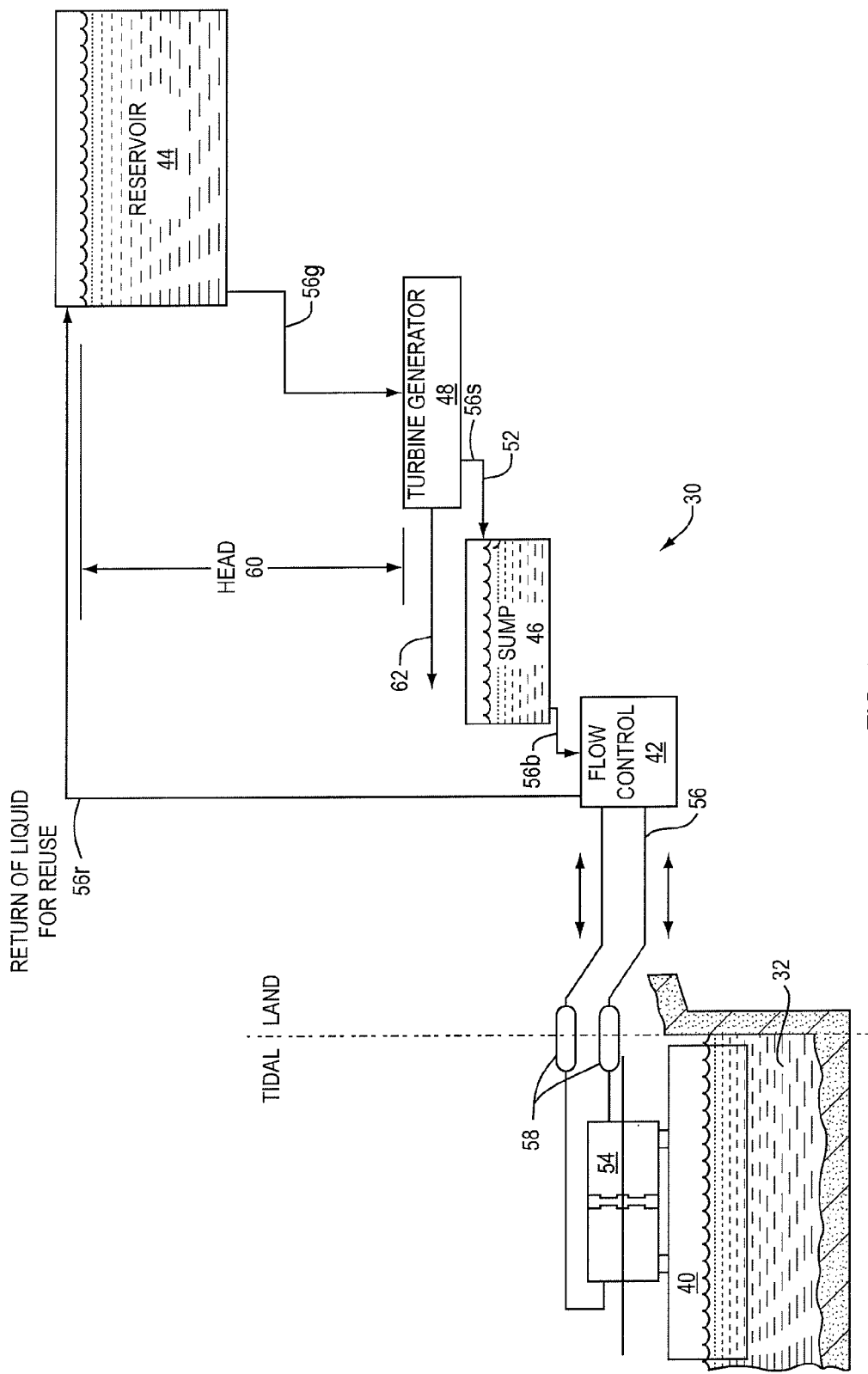
FIG. 2 is a schematic elevation view of the tide activated system of the present invention.

Referring to FIG. 2, a schematic elevation view of the tide activated system 30 is shown. The float/weight barges 40, one shown, move up and down in the lagoon 32 as the tide ebbs and floods. Tide floods and ebbs are also referred to as tide flow. As will become more evident from details below, the system 30 compensates for variations in tides. For example in the spring tide, the large ebb and flow of the tide at or soon after a new and full moon, will result in more working fluid 52 flowing through the system 30 in a tidal period; a tidal period is one cycle such as from high tide to high tide or low tide to low tide.

The movement of the barges 40 results in working fluid 52 being acted upon in the cylinders 54 on the barges 40 as explained below with reference to FIGS. 4A-4C. The working fluid 52 is transported from the cylinders 54 to the flow control 42 via piping 56 including a flexible conduit 58. The action on the working fluid 52 in the cylinders 54 is sufficient to force working fluid 52 up to the reservoir 44. The reservoir 44 is at the highest elevation in the system 30 and stores the working fluid 52 and the associated potential energy. The working fluid 52 is fed to the turbine 48. The pressure head, which is represented by the line 60, is the pressure of a fluid expressed in terms of the height of a column of liquid from the top of the reservoir 44 to the entrance to the turbine 48. In the embodiment shown, the turbine 48 is a turbine generator 48 that generates electricity. This pressure head 60 yields an equivalent pressure and is one of the factors in determining how much electrical energy, as represented by arrow 62, the turbine generator 48 extracts from the working fluid 52. The working fluid 52 flows to the sump 46 from the turbine generator 48. The sump 46 holds the working fluid 52 for feeding to the cylinders 54 through the flow control system 42.

The turbine generator 48 has a working fluid input port for receive the working fluid 52 from the reservoir 44. The working fluid 52 exits the turbine 48 through a working fluid output port. The turbine has a series of blades for interacting with the working fluid for converting the energy from the working fluid into another form of energy.

Figure 3A:
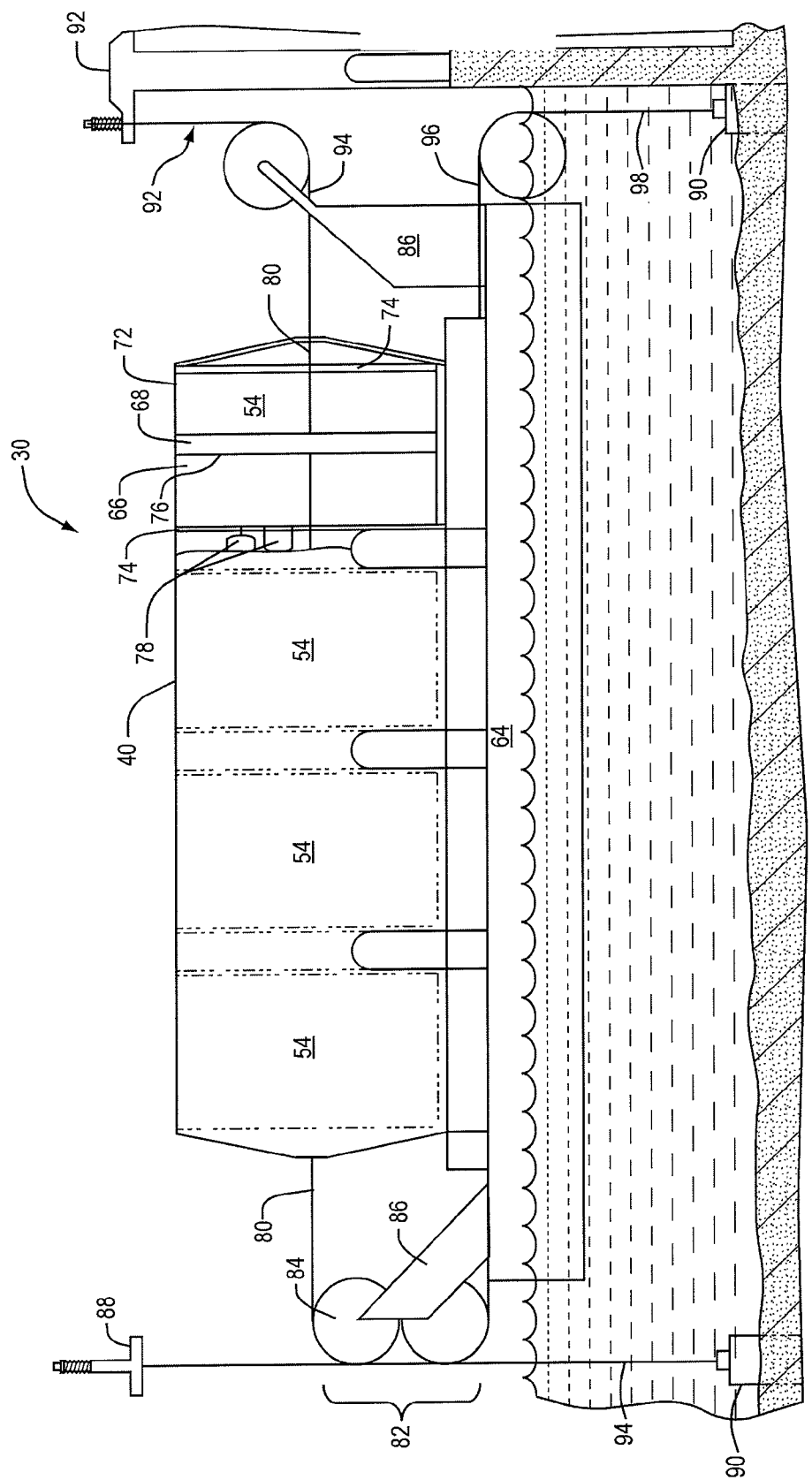
FIG. 3A is a side elevation of a float/weight barge with portions broken away.

While only one cylinder 54 is shown in FIG. 2, it is contemplated that a plurality of cylinders 54 will work in parallel. As explained below, FIG. 3A shows four cylinders 54. The arrangement shown in FIG. 1, contemplates in one embodiment, ten float/weight barges 40, each with four cylinders 54. The forty cylinders 54 work in parallel. The combination of the multiple cylinders 54 provides force to move working fluid 52 to the reservoir 44.

Figure 5:
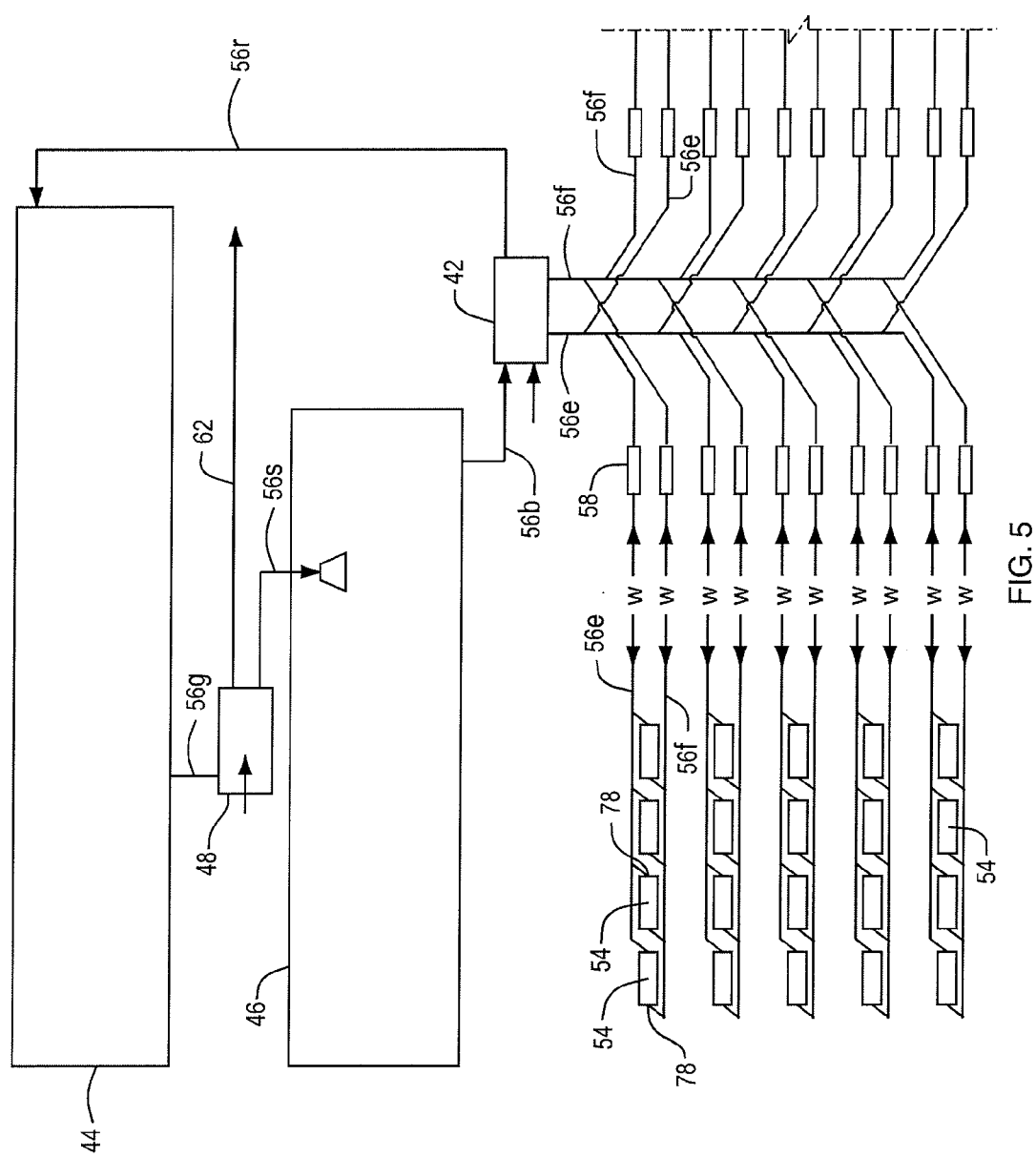
FIG. 5 is a schematic of the piping system of the tide activated system.

Referring to FIG. 3A, a side elevation of a float/weight barge 40 with portions broken away is shown. The float/weight barge 40 has a plurality of cylinders 54. The four cylinders 54, three of which are shown in hidden line, are aligned in a series on a barge portion 64 of the float/weight barge 40. Each of the cylinders 54 defines a chamber 66 holding a piston 68. The piston 68 is moveable in the chamber 66 and defines a pair of variable size chambers 70e and 70f. Each variable size chamber 70e and 70f is defined by a cylindrical wall 72 of the cylinder 54, a head or end wall 74 of the cylinder 54 and a face 76 of the piston 68. A port 78 of the piping 56 is located on the end wall 74 of each cylinder 54 and is in communication with the flow control system 42, as seen in FIGS. 2 and 5. The variable size chambers 70e and 70f will be referred to at times in the specification as ebb variable size chamber 70e and the flood variable size chamber 70f. The chambers 70e and 70f are similar and can function as either dependent on the orientation of the float/weight barge 40 in the tide activated system 30, the piston 68 movement is dependent on a pumping cable system as explained below.

The ebb variable size chamber 70e forces the working fluid towards the reservoir 44 during an ebbing tide as explained in further detail below. The flood variable size chamber 70f forces the working fluid towards the reservoir 44 during a flooding tide as explained in further detail below.

The float/weight barge 40 has a shaft 80 that extends through the end walls 74 of the cylinder 54 and each piston 68. The shaft 80 is movable relative to the end walls 74 of the cylinder 54 of the cylinder. The pistons 68 move with the shaft 80.

Still referring to FIG. 3A, the float/weight barge 40 has a cable guide system 82. The cable guide system 82 has a series of pulleys 84 positioned by frames 86 from the barge portion 64 of the float/weight barges 40.

In addition to the causeway 50, the tide activated system 30 has an outboard beam 88. The outboard beam 88 extends from the central sea wall 38, as seen in FIG. 1, to the perimeter sea wall 36. Both the causeway 50 and the outboard beam 88 have a series of anchoring devices 90 located in the bottom of the lagoon 32 to assist in positioning the float/weight barge 40.

The tide activated system 30 has a pumping cable system 92 extending from the causeway 80 to the anchoring device 90 underlying the outboard beam 88. The pumping cable system 92 includes a pair of cables 94 and a shaft 80 for each float/weight barge 40. The pumping cable system 92 is guided from the causeway 80 to the anchoring device 90 by the pulleys 82 of the cable guide system 80. In addition to the pumping cable system 92, the tide activated system 20 has a stabilizing cable system 96 including a cable 98 for each float/weight barge 40. The cable 98 is guided from the outboard beam 88 to the anchoring device 90 of the causeway 50.

Figure 3B:
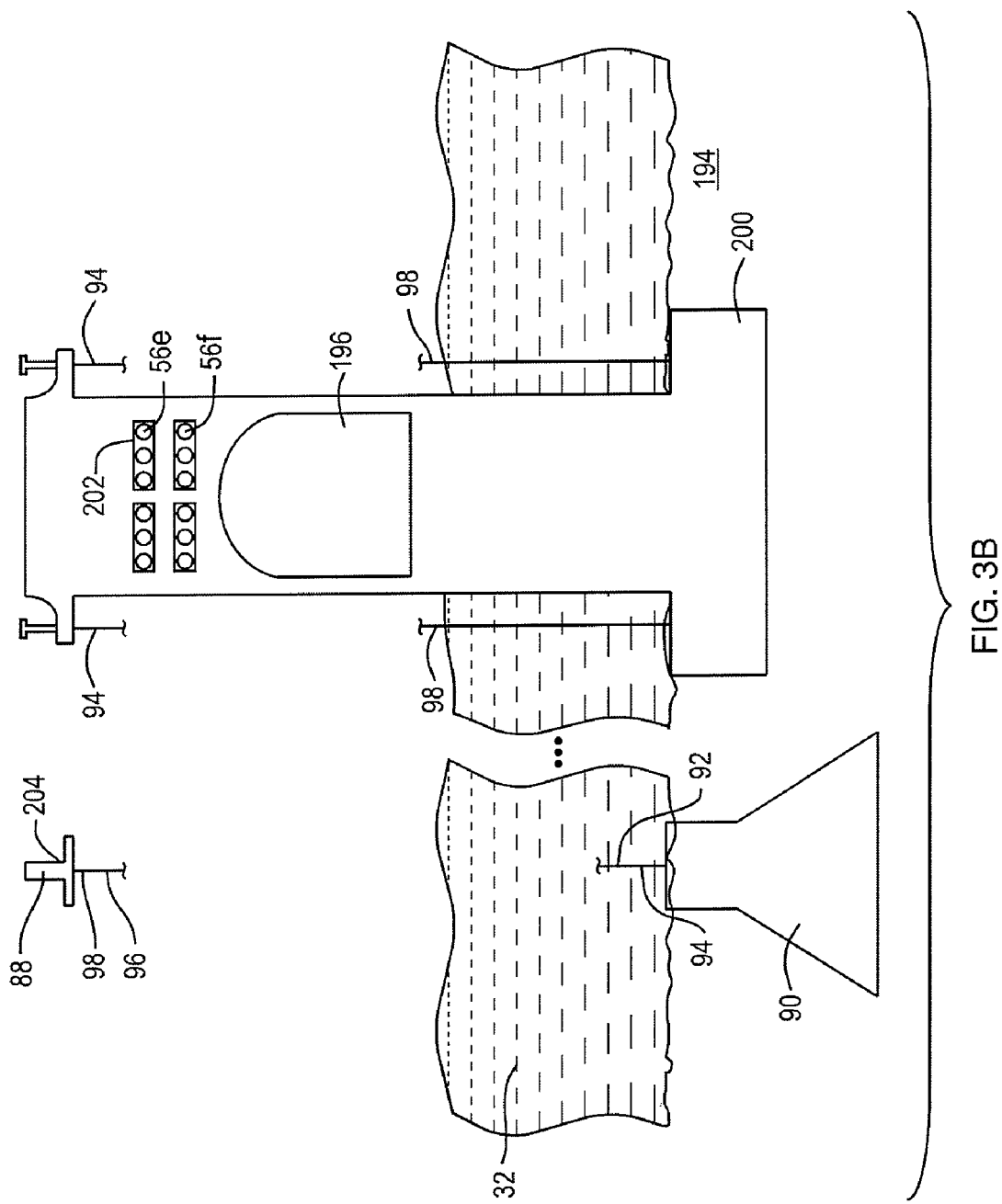
FIG. 3B is a schematic side view of the causeway.

Referring to FIG. 3B, a side sectional view of the causeway 50 is shown. The tide activated system 30 has the lagoon 32 that has water, salt water, that ebbs and flows with the tidal body of water 20 seen in FIG. 1. The central sea wall 38, as seen in FIG. 1, is connected by the causeway 50 to the perimeter sea wall 36. The causeway 50 as seen in FIG. 3B, serves several functions. The causeway 50 extends from the base 194 of the lagoon 32 and has a passageway 196 for access to the float/weight barges 40. The cables 94 of the pumping cable system 92 are secured to a tension system 198 on the causeway 50. The cables 98 of the stabilizing cable system 96 are connected to the anchoring device 90, which is the footing 200 of the causeway 50 in this embodiment.

The piping 56e and 56f are shown in the conduit 202 in the causeway.

Still referring to FIG. 3B, the outboard beam 88 is shown. The cable 98 of the stabilizing cable system 96 is connected to a tension system 204 on the beam 88. The cable 94 of the pumping cable system 92 is connected to the bell pier anchor 90.

It is recognized as an alternative to the bell pier anchor shown as anchoring device 90 in FIG. 3B, a concrete floor can be located at the bottom of the lagoon 32 underlying the area where the float/weight barges 40 are located. In that embodiment, the cables 94 of the pumping cable system 92 and the cables 98 of the stabilizing cable system 96 are secured to the concrete floor as the anchoring device 90.

Figure 4A:
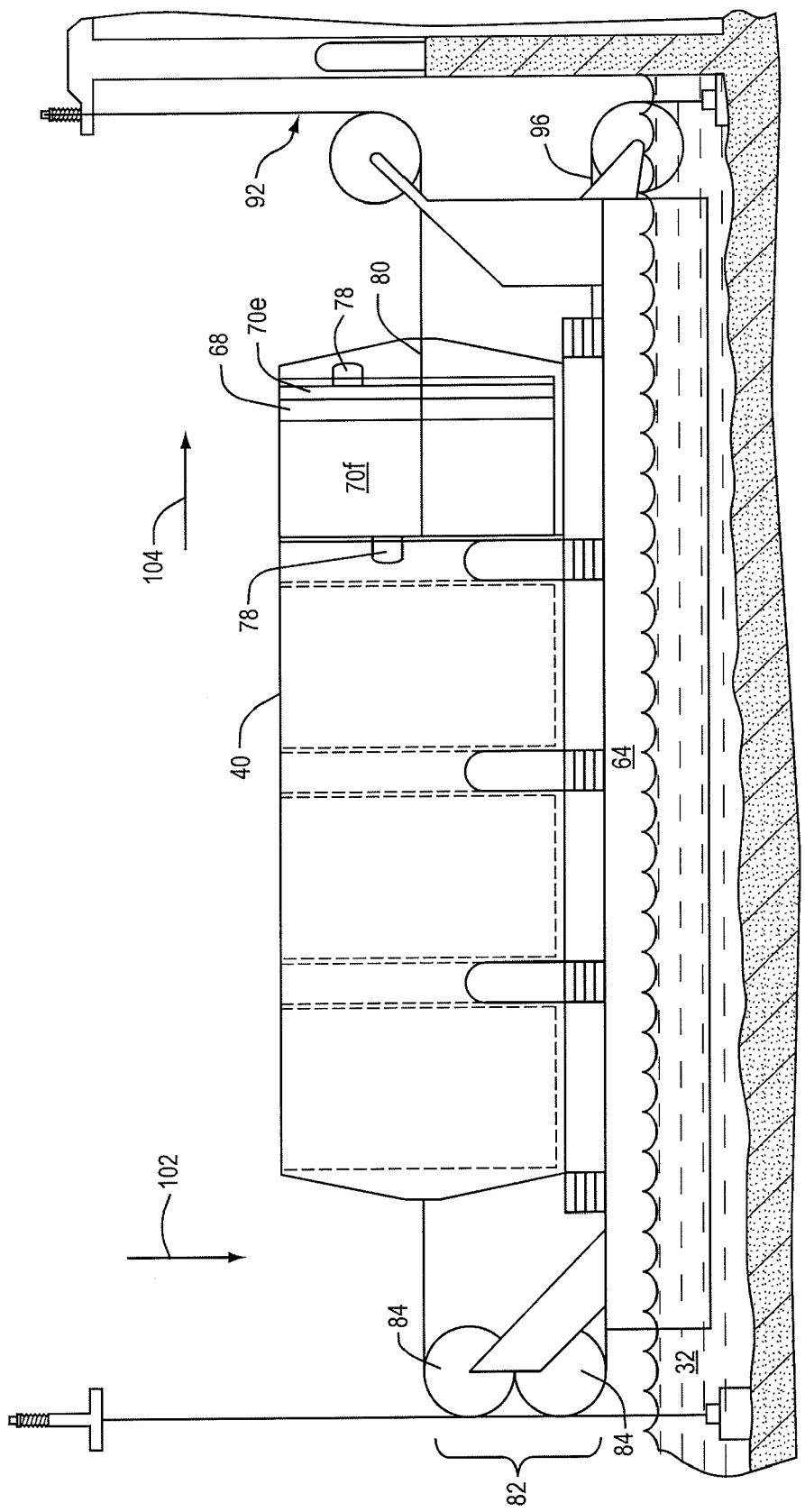
FIG. 4A is a side elevation of a float/weight barge with portions broken away near a low tide with the tide ebbing towards the low tide.

Referring to FIG. 4A, a side elevation of a float/weight barge 40 with portions broken away is shown near a low tide with the tide ebbing towards the low tide. The piston 68 is to the right in the FIG therein the flood variable size chamber 70f is near maximum size and the ebb variable size chamber 70e is near minimum size. As the tide continues to ebb towards low tide, the float/weight barge 40 moves vertically downward, both the pumping cable system 92 and the stabilizing cable system 96 retain the float/weight barge 40 in its position in the lagoon 32 while allowing the barge 40 to move vertically downward, as represented by arrow 102, as the level of water in of the lagoon 32 drops. The cable systems 92 and 96 move relative to the pulleys 84 of the cable guide system 82. The weight of the float/weight barge 40 causes the float/weight barge 40 to drop, move vertically downward, as the level of the lagoon 32 drops, which results in the shaft 80 of the pumping cable system 92 moving to the right in the FIG. As the shaft 80 moves to the right, the piston 68 moves to the right, as represented by arrow 104, forcing the working fluid 52 out of the ebb variable size chamber 70e. As the piston 68 moves to the right, the flood variable size chamber 70f increases in size and working fluid 52 flows into the flood variable size chamber 70f.

Figure 4B:
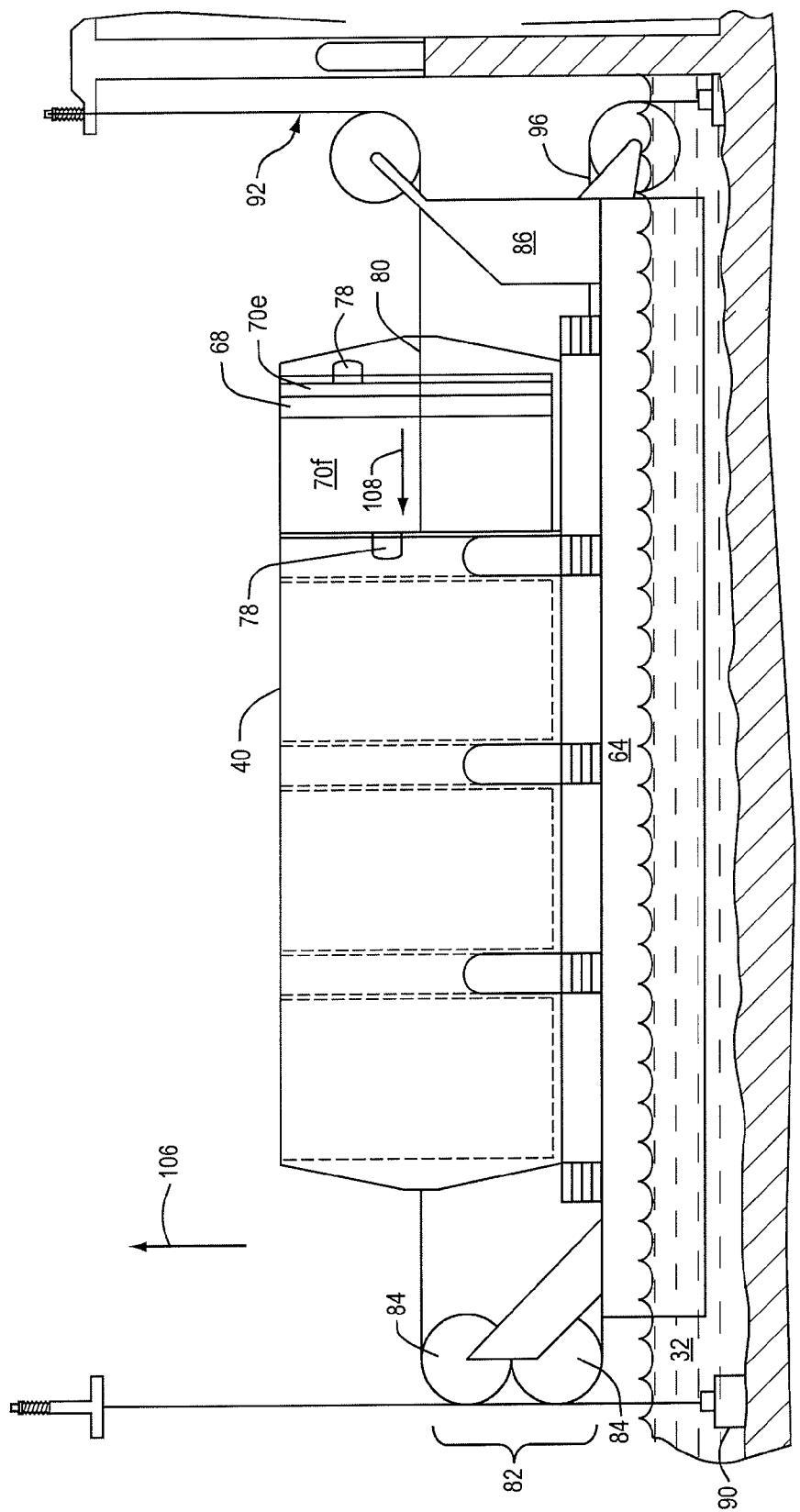
FIG. 4B is a side elevation of a float/weight barge with portions broken away near a low tide with the tide flooding towards the high tide.

Referring to FIG. 4B, a side elevation of a float/weight barge 40 with portions broken away is shown near a low tide moving to high tide as the tide continues to flow or flood. As in FIG. 4A, the piston 68 is to the right in the FIG therein the flood variable size chamber 70f is near maximum size and the ebb variable size chamber 70e is near minimum size. However in contrast to FIG. 4A, the tide is flooding towards high tide with the float/weight barge 40 moving vertically upward, as represented by arrow 106, as the level of the lagoon 32 rises. The buoyancy of the float/weight barge 40 causes the float/weight barge 40 to rise, moving vertically upward, as the level of the lagoon 32 rises, which results in the shaft 80 of the pumping cable system 92 to move to the left in the FIG. As the shaft 80 moves to the left, as represented by arrow 108, the piston 68 moves to the left forcing the working fluid 52 out of the flood variable size chamber 70f. As the piston 68 moves to the left, the ebb variable size chamber 70e increases in size and working fluid 52 flows into the ebb variable size chamber 70e. How the tide activated system 30 compensates for the different direction the piston 68 moves and the flow of the working fluid 52 is addressed below with respect to FIGS. 5, 6A, and 6B.

Figure 4C:
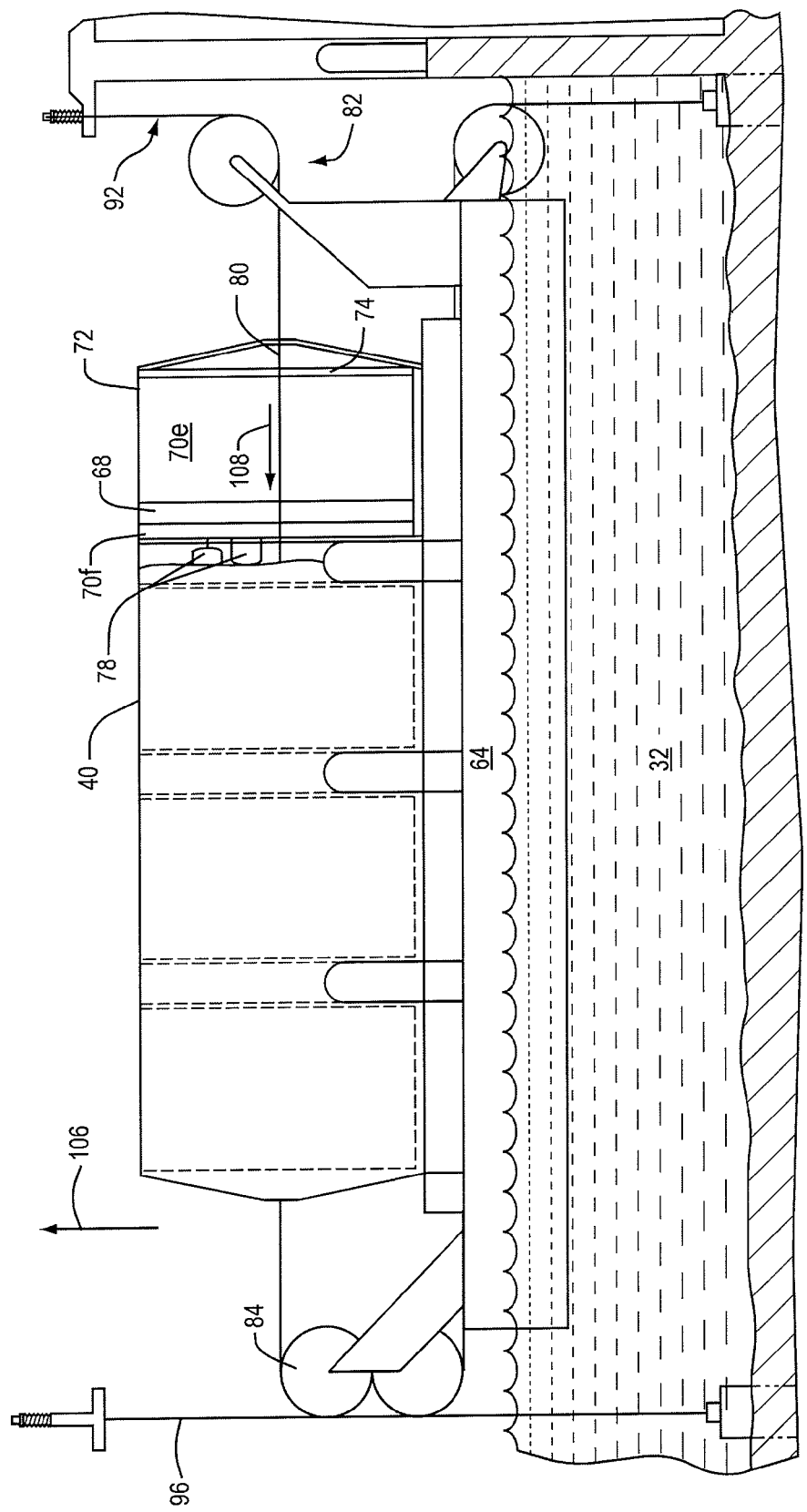
FIG. 4C is a side elevation of a float/weight barge with portions broken away near a high tide with the tide flooding towards the high tide.

Referring to FIG. 4C, a side elevation of a float/weight barge 40 with portions broken away is shown near a high tide moving to high tide as the tide continues to flow or flood. The piston 68 is to the left in the cylinder 54 in the FIG therein the flood variable size chamber 70f is near minimum size and the ebb variable size chamber 70e is near maximum size. The tide is flooding towards high tide with the float/weight barge 40 moving vertically upward, as represented by arrow 106, as the level of water in the lagoon 32 rises. As the float/weight barge 40 moves vertically, both the pumping cable system 92 and the stabilizing cable system 96 retain the float/weight barge 40 in its position in the lagoon 32 while allowing the barge 40 to continue to move vertically upward as the level of the lagoon 32 rises from that of FIG. 4B. The cable systems 92 and 96 move relative to the pulleys 84 of the cable guide system 82.

The buoyancy of the float/weight barge 40 causes the float/weight barge 40 to continue moving upward as the level of the lagoon 32 rises, which results in the shaft 80 of the pumping cable system 92 moving to the left in the FIG, as represented by arrow 108. As the shaft 80 moves to the left, the piston 68 moves to the left. The majority of the working fluid 52 that was in the flood variable size chamber 70f in FIG. 4B has been pushed out of the chamber 70f by the piston 68. The working fluid 52 has been moved through the port 78 through the piping 56 to the flow control system 42, as seen in FIG. 5 as described below. As the piston 68 moves to the left, the ebb variable size chamber 70e increases in size and working fluid 52 flows into the variable size chamber 70e through port 78.

Referring to FIG. 5, a schematic of the piping system of the tide activated system is shown. As indicated above, the tide activated system 30 in an embodiment has a plurality of float/weight barges 40 each with four cylinders 54. Each cylinder 54 has a piston 68, not shown in this FIG., that divides the chamber 66 into a flood variable size chamber 70f and an ebb variable size chamber 70e. The port 78 to each of the flood variable size chambers 70f on one of the float/weight barges 40 is connected by a flood flow piping 56f and the port 78 to each of the ebb variable size chambers 70e on one of the float/weight barges 40 is connected by an ebb flow piping 56e. The flood flow piping 56f and the ebb flow piping 56e are each connected with their respective flexible conduits 58 to the piping 56e and 56f that extends to the flow control system 42. The flood flow piping 56f from each of the cylinders 54 from each of the float/weigh barges 40 are connected and designated as piping 56f. The ebb flow piping 56e from each of the cylinders 54 from each of the float/weight barges 40 are connected and designated as piping 56e. The combined flood flow piping 56f and the combined ebb flow piping 56e each go to the flow control system 42, which is described in more detail with reference FIGS. 6A and 6B. The working fluid 52 is routed from the flow control system 42 to the reservoir 44 by pipe 56r. The working fluid 52 is fed to the turbine generator 48 from the reservoir 44 by the piping 56g. The working fluid 52 flows to the sump 46 from the turbine generator 48 through the piping 56s. The sump 46 holds the working fluid 52 for feeding to the cylinders 54 through the flow control system 42 via piping 56b.

Figure 6A:
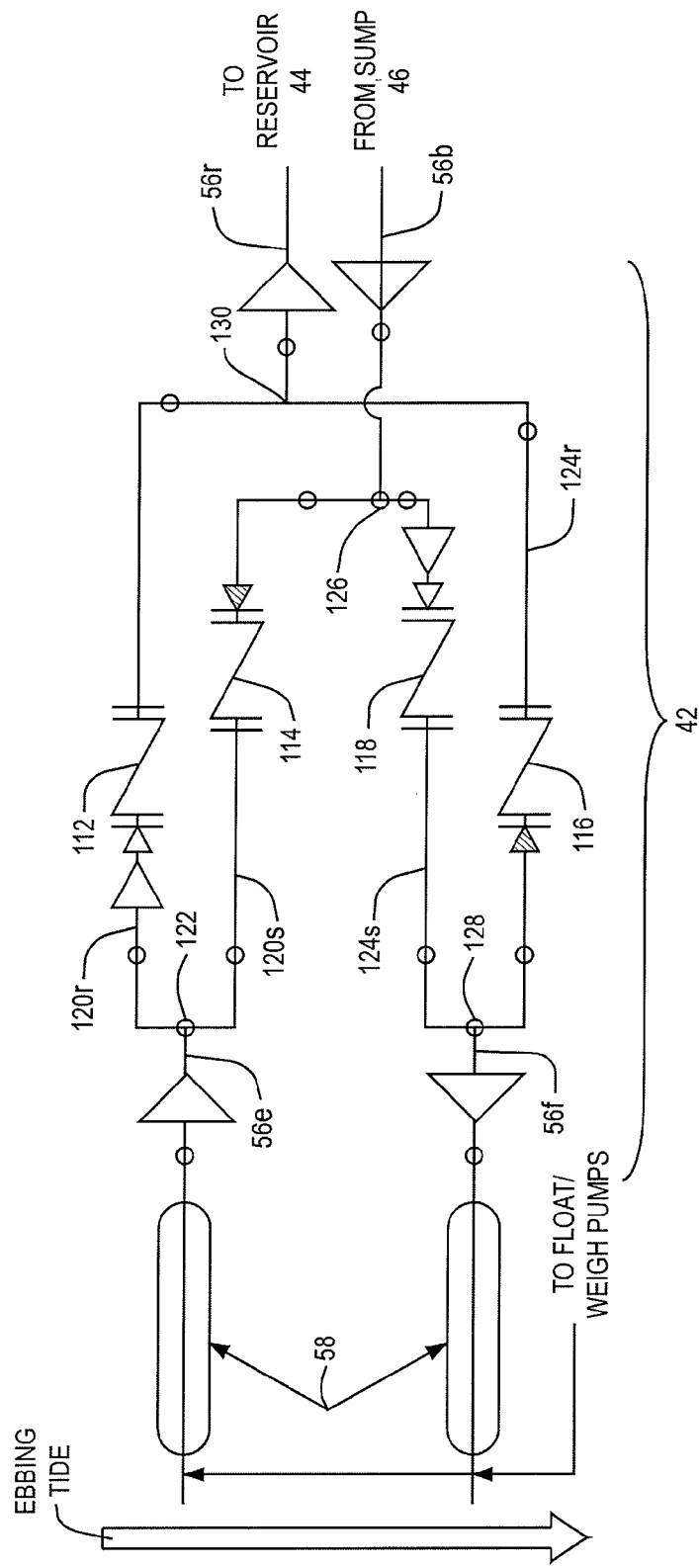
FIG. 6A is a schematic of the flow control during an ebbing tide.

Referring to FIG. 6A, a schematic of the flow control system 42 during an ebbing tide is shown. The piston 68 is being forced to the left by the shaft 80, as explained in FIG. 4A causing the working fluid 52 in the ebb variable size chamber 70e to be forced towards the flow control system 42. As indicated above, the fluid from all the ebb variable size chambers 70e are combined. The size of the flood variable size chambers 70f are all increasing, allowing working fluid 52 to flow to those locations from the flow control system 42. In fact, the movement of the piston 68 draws working fluid 52 into the flood variable size chambers 70f from the sump 46.

The flow control system 42 has a series of check valves 112, 114, 116, and 118 as seen in FIG. 6A to allow the working fluid 52 to move in the proper path as further explained below. All of the ebb variable size chambers 70e are connected to the piping 56e including the flexible conduit 58 that extends from the float/weight barge 40 to the causeway 50. The pipe 56e for the working fluid 52 enters the flow control system 42. The pipe 56e splits into two pipes 120r and 120s at a T-component or tee 122. Both pipes 120r and 120s are generally the same size. While both pipes 120r and 120s contain working fluid 52, only one pipe 120 at a time will have a substantial flow. The pipe 120r is connected to the reservoir 44 and has the check valve 112. The pipe 120r is connected to the reservoir 44 by a second tee 130 in the flow control system 42 and the piping 56r. The other pipe, the pipe 120s is connected to the sump 46 and has the check valve 114 which is closed preventing fluid flow from the sump 46 as explained below.

As the working fluid 52 is being forced out of the ebb variable size chambers 70e by the movement of the piston 68 in each cylinder 54, the working fluid 52 exerts force on the check valve 112, opening the valve. The working fluid 52 is pushed, with a portion of the working fluid reaching the reservoir. The other check valve, check valve 114, located in the pipe 120s is oriented in the opposition direction such that the force of the working fluid 52 forces the check valve 114 closed, thus the working fluid 52 cannot flow from the sump 46 to the ebb variable size chambers 70e.

Still referring to FIG. 6A, while the piston 68 is moving to compress and force working fluid 52 out of the ebb variable size chamber 70e, the flood variable size chamber 70f, the non-pumping chamber, is increasing in size. The increase in space allows working fluid 52 to flow from the sump 46 through the flow control system 42 to the flood variable size chamber 70f. The flow enters the flow control system 42 from the piping 56b from the sump 46. The piping 56b, similar to the piping 56e and 56f from the cylinders 54, splits into two pipes 124s and the previously described 120s at a tee 126. Each pipe 120s and 124s is generally the same size. As with the flow from the ebb variable size chamber 70e, both pipes 120s and 124s connected to the sump 46 have working fluid 52, however only one pipe at a time will have substantial flow.

The pipe 120s, which is associated with check valve 114, and the ebb variable size chamber 70e, has no flow in that the check valve 114 is forced closed by the working fluid 52 being pushed by the piston 68 as explained above, which is greater than the force created by the pressure created by the working fluid in the sump 46.

In that the flood variable size chambers 70f are increasing in size and the sump 46 is creating a force on the check valve 118, the valve is open and the working fluid 52 is allowed to flow from the sump 46 to fill the increasing size flood variable size chambers 70f.

The final check valve, check valve 116, which is part of pipe 124r, which connects the flood variable size chamber 70f to the reservoir 44 is held closed. The working fluid 52 that passes through the tee 122 has a larger force than that on the other side. On the other side of the check valve 116 the working fluid 52 is likewise closing the valve.

Figure 6B:
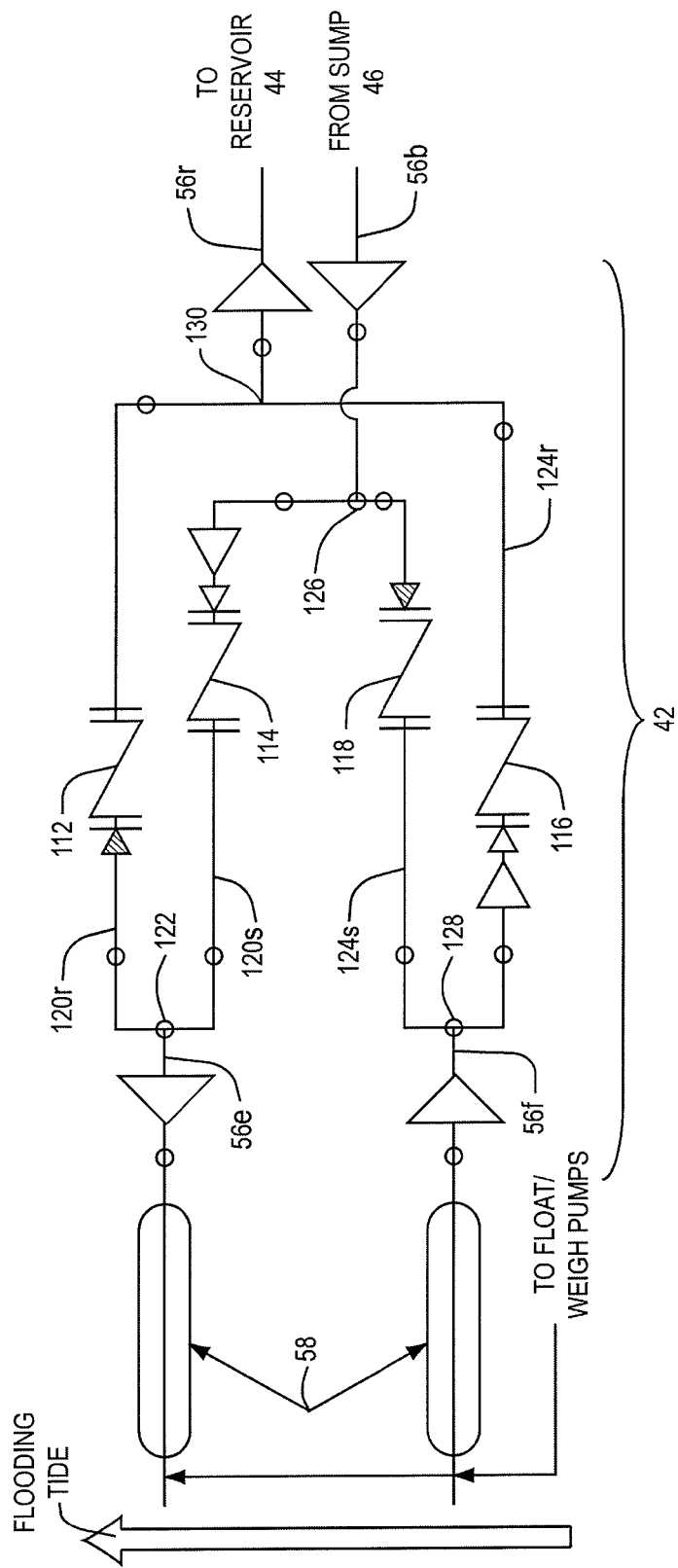
FIG. 6B is a schematic of the flow control during a flooding tide.

Referring to FIG. 6B, a schematic of the flow control during a flooding tide is shown. During a flooding tide, the shaft 80 and the associated pistons 68 are moving in the opposite direction than they were in ebbing tide as described above with respect to FIGS. 4A-4C. The working fluid 52 is being forced by the piston 56 from the flood variable size chamber 70f through the pipe 56f, the tee 128, the pipe 124r including the check valve 116, the tee 130, and pipe 56r to the reservoir 44. The force of the working fluid 52 keeps the check valve 116 open and keeps the check valve 118 closed. The ebb variable size chamber 70e which was providing the working fluid 52 as the tide was ebbing to the reservoir 44, is now increasing in size. The working fluid 52 from the sump 46 flows through the tee 126, the pipe 120s including check valve 114, and the tee 122 to the piping 56e into the ebb variable size chamber 70e. The check valve 112 is held closed.

Figure 7:
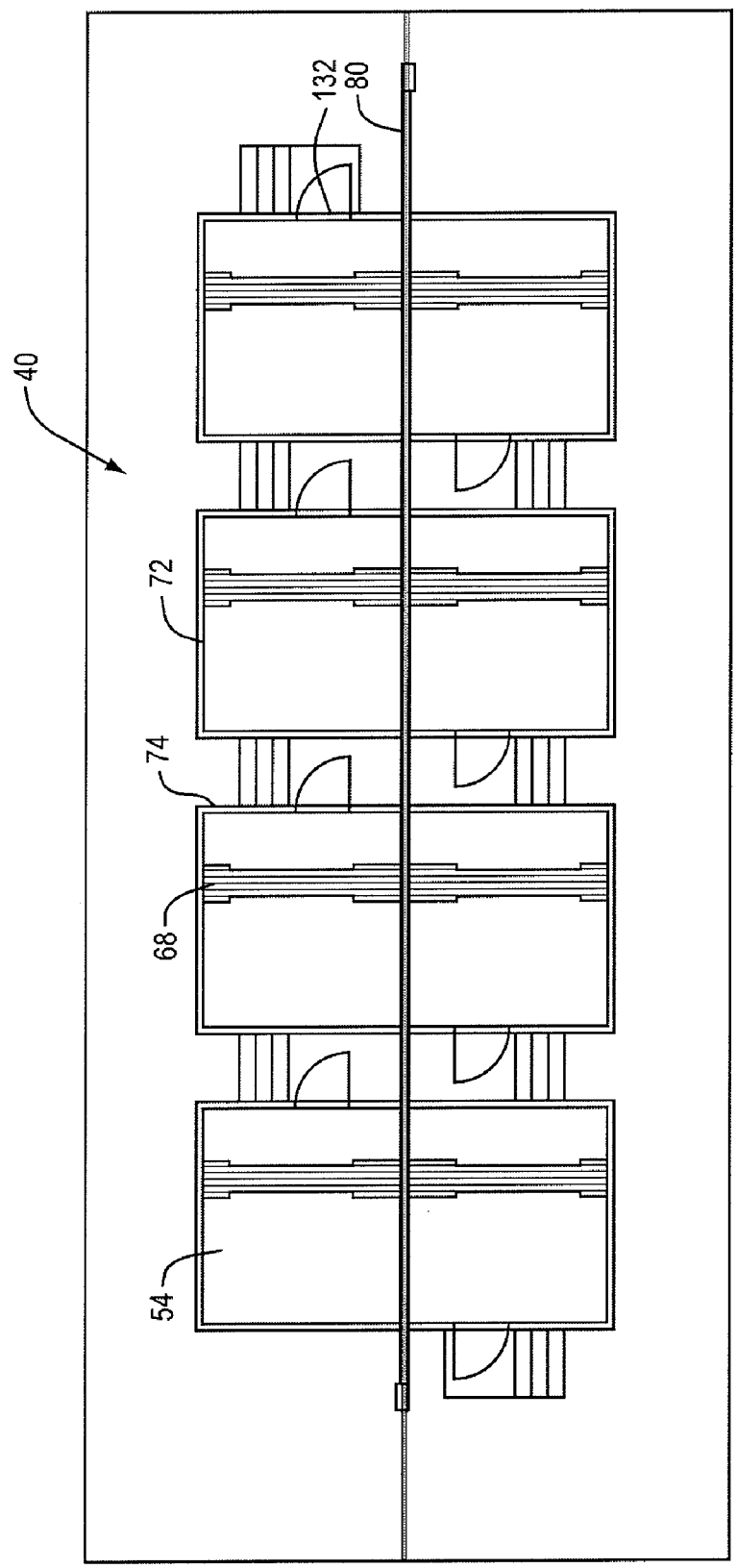
FIG. 7 is a top sectional view of the float/weight barge taken along the line 7-7 of FIG. 3A.

As way of an example, FIG. 1 shows ten float/weight barges 40. Referring to FIG. 7, a top sectional view of one of the float/weight barges 40 is shown. In this example, the float/weight barge 40 is 32 feet by 80 feet and has four cylinders 54. Each cylinder is twelve feet in length and has a piston 68 that is cylindrical and has a diameter of 20 feet. Each piston 68 is connected to the shaft 80. Recognizing that the shaft 80 and the piston 68 take up a portion of the chamber 66, the chamber 66 in each cylinder 54 is approximately 3770 cubic feet.

Still referring to FIG. 7, each cylinder 54 has an access port or door 132 on each end wall 74. These access ports 132 are typically sealed, but allow access to each of the variable size chambers 70e and 70f for initial assembly and maintenance.

Figure 8:
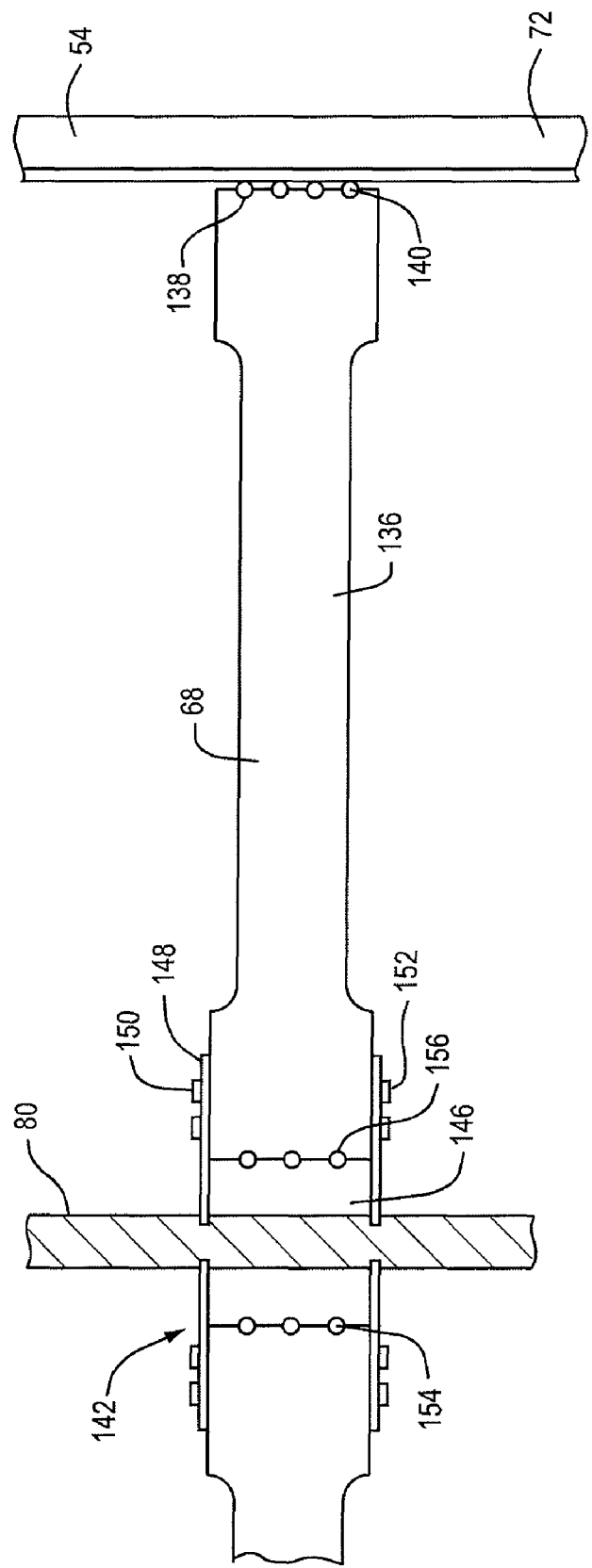
FIG. 8 is a sectional view of a portion of the piston and the shaft.
Figure 9A:
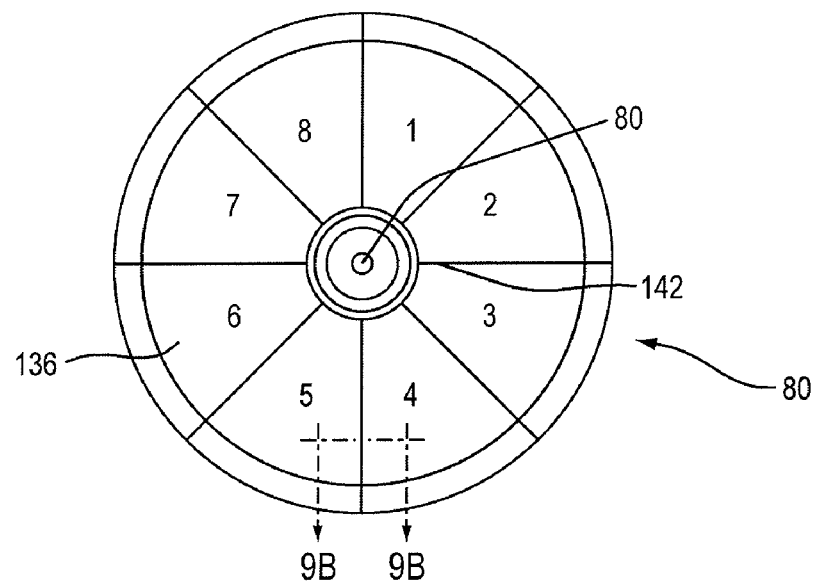
FIG. 9A is a schematic view of the piston.
Figure 9B:
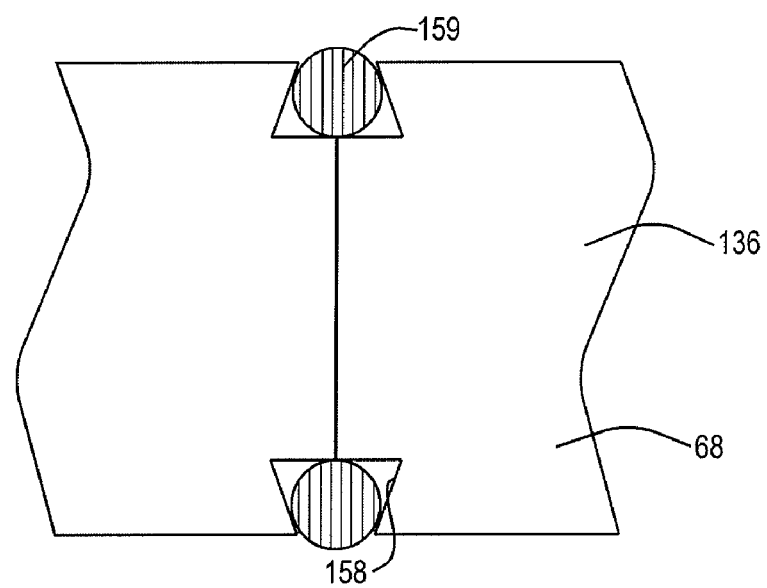
FIG. 9B is a sectional view of the piston taken along the line 9B-9B of FIG. 9A.
Figure 10:
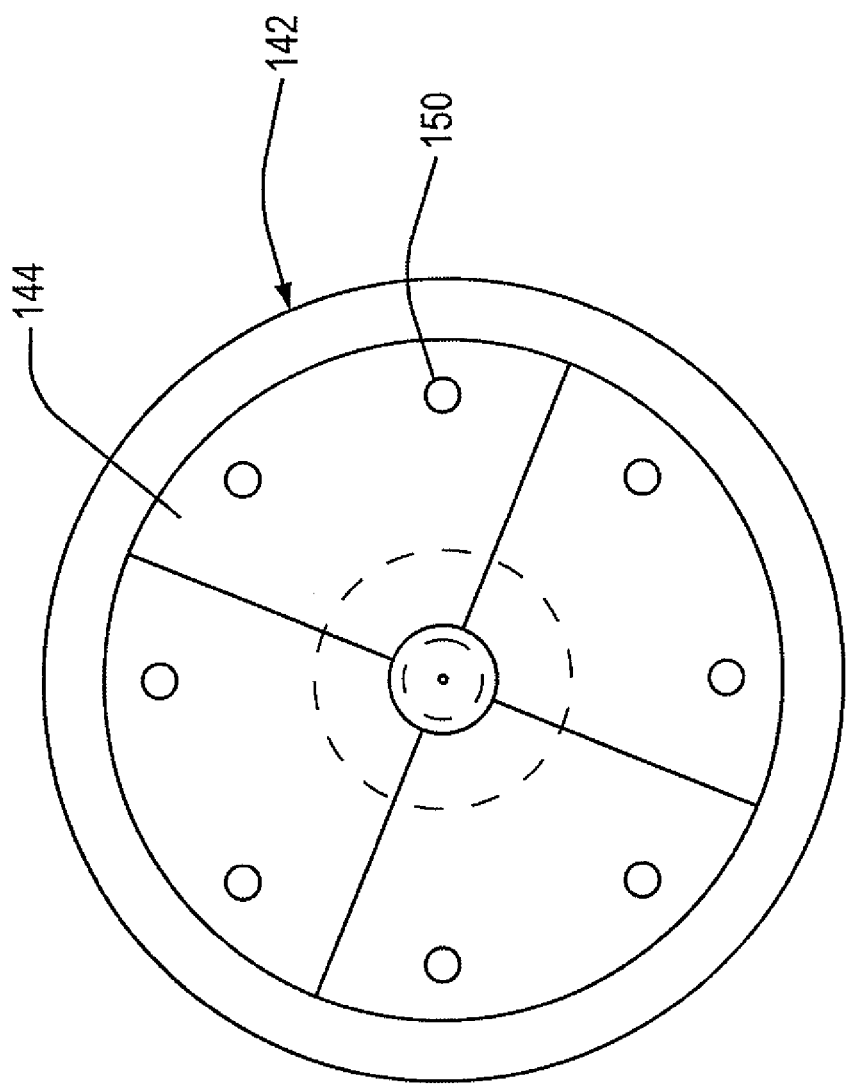
FIG. 10 is a side view of the piston/shaft interface.

FIG. 8 shows a sectional view of a portion of the piston 68 and the shaft 80 is shown. FIG. 9A shows a schematic view of the piston 68. FIG. 9B shows a sectional view of the piston taken along the line 9B-9B of FIG. 9A. FIG. 10 shows a side view of the piston/shaft interface.

Referring to FIG. 8 the shaft 80 extends through the piston 68. The piston 68 has a plurality of segments or sectors 136, as best seen in FIG. 9A, that extend from the shaft 80 to the cylindrical wall 72 of the cylinder 54 as seen in FIG. 8. The end of each sector 136 has a plurality of grooves 138 that each accept a large sealing "O" ring 140. The "O" rings 140 engage the cylindrical wall 72 to form a seal.

While each side of the chamber 66, that is the variable size chamber 70e and the variable size chamber 70f has working fluid 52, the movement of the piston 68 creates a pressure differential which would result in working fluid 52 flowing between the chambers 70e and 70f. The sealing "O" rings 140 prevent flow between the two chambers 70e and 70f.

In that the piston 68 has a plurality of sectors 136, the piston 68 has a groove 158 formed on each side of the piston 68 when the sectors 136 are positioned next to each other as seen in FIG. 9B. A seal 159 is inserted into the groove 158 to prevent flow between the two chambers 70e and 70f.

The shaft 80 has at four locations a mounting bracket 142, one of which is shown in FIG. 8. Each mounting bracket 142 is positioned on the shaft 80 so that each piston 68 is in the same relative position in its respective cylinder 54. Each of the mounting brackets 142 has a pair of half annular rings 144. Each annular ring half 144 has a center portion 146 and a pair of mount plates 148. The center portion 146 is located between the segments or sectors 136 of the piston 68 and the shaft 80. The mounting plates 148 are positioned such that the sector 136 of the piston 68 is interposed between as seen in FIG. 8. The mounting plates 148 extend into the shaft 80. A bolt 150 and nut 152 secure each of the segments or sectors 136 to the mounting plates 148, which also locks the mounting plates 148 to the shaft 80 by encircling the shaft 80. FIG. 10 shows the position of the mounting plates 148 relative to the segments or sectors 136. A series of sealing "O" rings 154 are located in a plurality of grooves 156 in the sectors 136 of the piston 68 and the center portion 146 of the mounting bracket 142 to form a seal between the piston 68 and the shaft 80.

Figure 11:
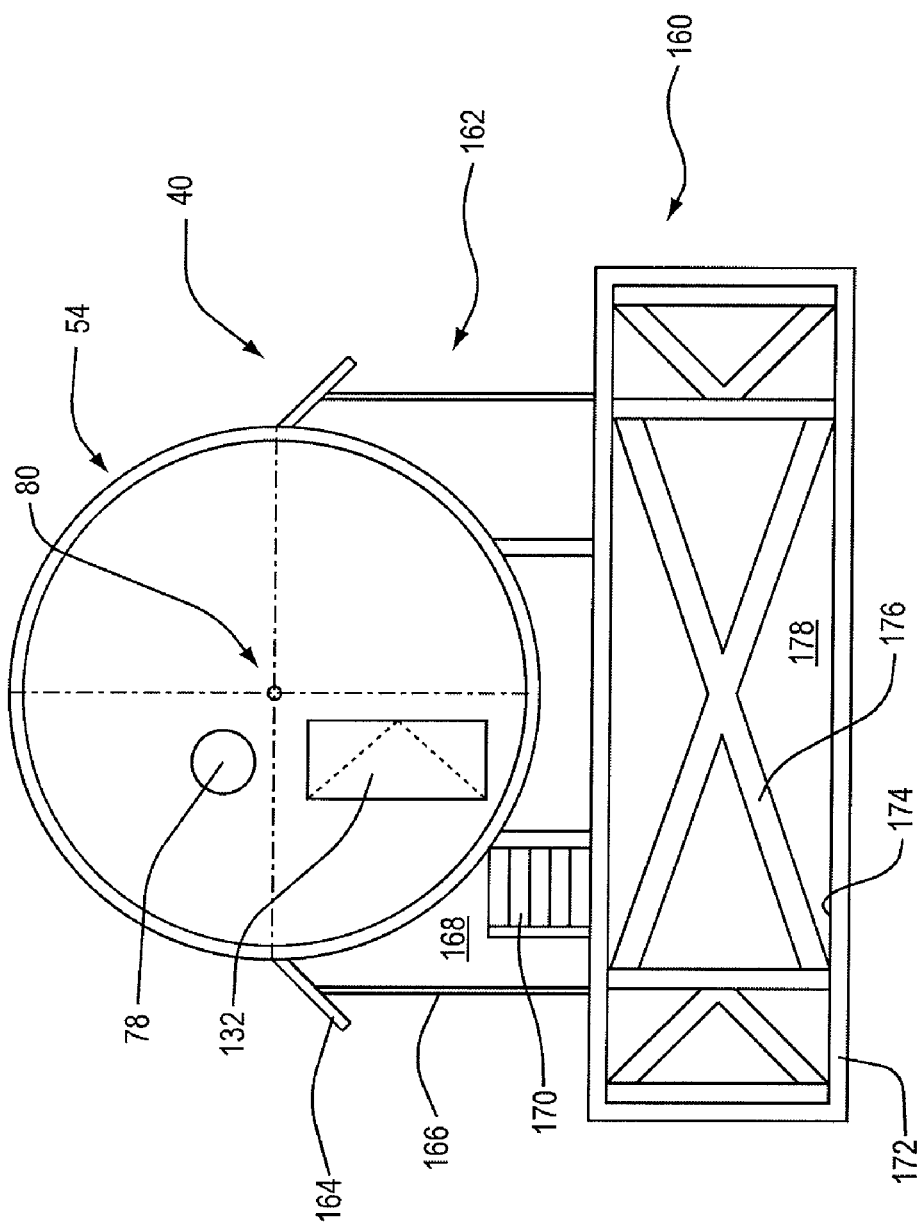
FIG. 11 is a transverse sectional view of the float/weight barge taken along the line 11 of FIG. 3A.

Referring to FIG. 11, a transverse sectional view of the float/weight barge 40 is shown. The float/weight barge 40 has the cylinder 54 which is located over a ballast section 160. The shaft 80 extends through the cylinder 54. In the embodiment shown, the float/weight barge 40 has a housing 162 consisting of a roof 164 and a wall 166 to protect a work space 168 including a set of steps 170 to the access port 132.

The ballast section 160 of the float/weight barge 40 is used to control buoyancy and stability of the float/weight barge. The ballast section 160 has an outer shell 172 and a frame 174 including a series of support ribs 176 defining a closed space 178. The ballast section 160 sits in the lagoon 32, as seen in FIG. 1 and FIG. 3A. The relative position the float/weight barge 40 in the lagoon 32 depends on the weight of the barge 40 and the amount of water of the lagoon 32 displaced by the ballast section 160. The location of the stabilizing cable system 96 is shown as slightly to one side of center. It is recognized that the stabilizing cable system 96 as explained in more detail with respect to FIGS. 3, 4A, and 4B could include multiple cables such as a pair with one on the starboard side of the barge 40 and the other on the port side of the barge 40.

The ballast section 160 is part of the buoyancy and weight system of the float/weight barge 40. While ballast is some times considered just added weight whether in the form of metal, water, concrete, etc, the structure of the float/weight barge 40 including the frame 174 is part of the ballast. Ballast is typically placed in water borne vessels to influence buoyancy and stability. The ballast section 160 can have additional ballast such as lead weights to achieve the proper weight/displacement in the lagoon 32. If ballast is added, it is desired to place the ballast low in the ballast section 160 and be of a material that has a high specific gravity to increase stability and occupy minimum space.

In one embodiment, the shaft 80 is stainless steel. The cylinder 54 is formed of a polymeric carbon fiber with a stainless steel lining. The frame 174 including the support ribs 176 of the ballast section 160 are formed of polymetric carbon fiber. The outer shell 172 is formed of fiberglass. The cable 94 of the pumping cable system 92 and the cable 98 of the stabilizing cable system 96 is formed of 1½ inch stainless steel cable.

The perimeter sea wall 36, the central sea wall 38, and the causeway 50 are formed of poured or preformed reinforced concrete.

Figure 12:
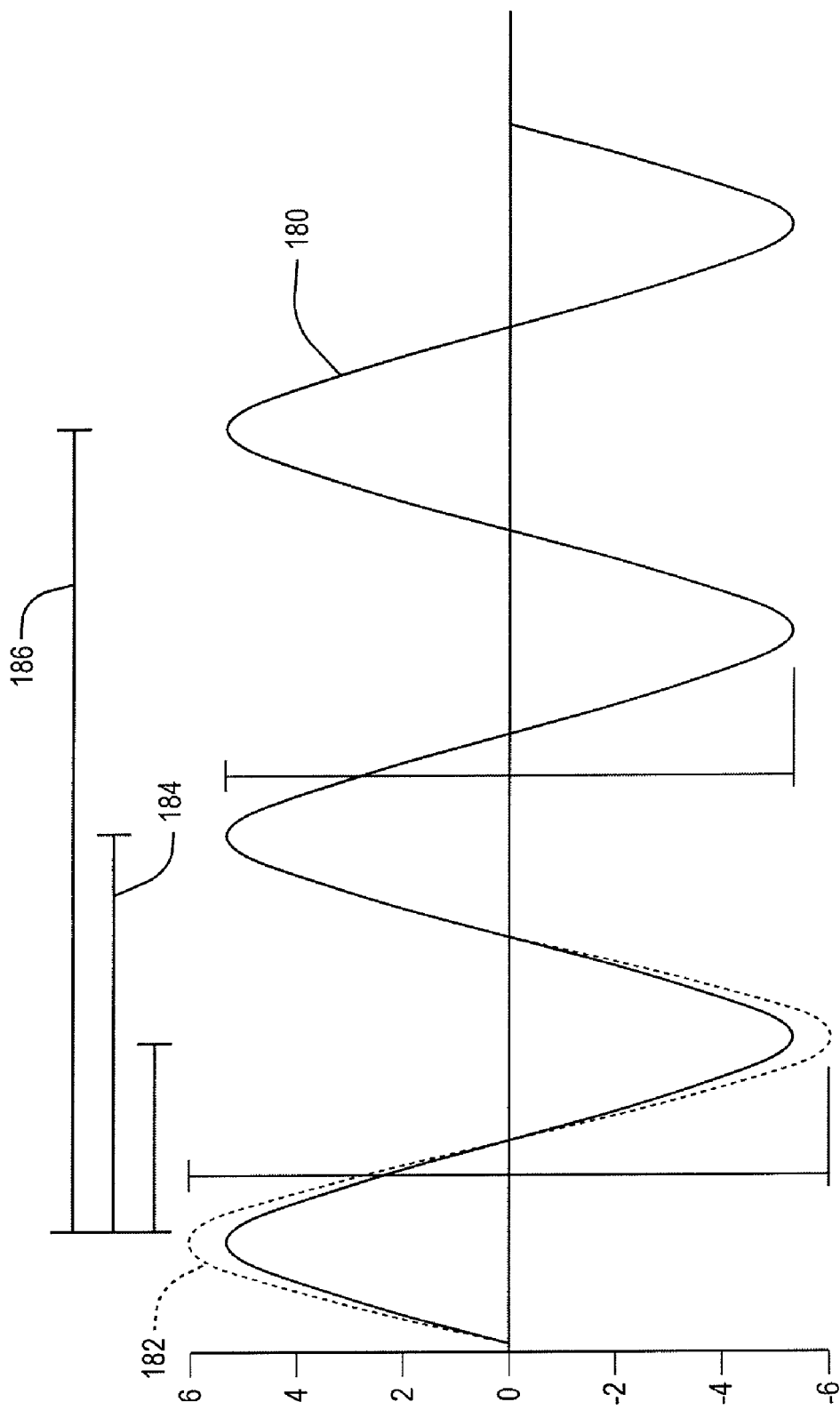
FIG. 12 is a schematic of tide patterns.

Referring to FIG. 12, a schematic of a tide pattern is shown. The ebb and flood of the tide is shown by a line 180. The tidal range from high tide to low tide is dependent on numerous factors including location, the sun and moon location, and weather. The tidal range shown in this example is generally 10 feet. However, the tide activated system 30 in this example is designed to accommodate tidal range of approximately 12 feet, as represented by dash line 182, in that the length of each cylinder 54 is that length and therefore the piston 68 has that range. The amount of working fluid 52 that the tide activated system 30 in a tidal period, a combination of ebbing tide and flood tide, forces to the reservoir 44 is dependent on the tidal range.

One example of a typical larger tidal range is a spring tide. A spring tide is the large rise and fall of the tide at or soon after the new or the full moon. The system 30 as indicated can compensate for these fluctuations in the tide.

A tidal period 184 is the cycle of the tide, such as high tide to high tide or low tide to low tide. A tidal period last approximately 12 hours 25 minutes. A tidal day 186 is 24 hours and 50 minutes in length. In a tidal day, the piston 68 in the cylinder 54 moves back and forth twice. The rate the piston 68 moves in the cylinder 54 is related to the slope of the line 180, therefore at high tide and low tide, the piston 68 will stop moving as it switches direction. At these times, no working fluid 52 is being forced into the reservoir 44.

As way of an illustration, an example where there are ten float/weight barges 40 as shown in FIG. 1, is given. Each barge 40 has four cylinders 54. In this example, the float/weight barge 40 is 32 feet by 80 feet and has four cylinders 54. Each cylinder is twelve feet in length and has a piston 68 that is cylindrical and has a diameter of 20 feet. Recognizing that the shaft 80 and the piston 68 take up a portion of the chamber 66, the chamber 66 in each cylinder 54 is approximately 3770 cubic feet. With four cylinders 54 per float/weight barge 40 and ten float/weight barges 40, the total capacity of all the chambers 66 is approximately 15,080 cubic feet. It is recognized that a portion of that space is taken up by the piston 68 and the shaft 80.

In addition, in the example the tidal range is 10 feet therefore the full stroke of the piston 68 is not used. The volume of the working fluid 52 forced out of each cylinder 54 in an ebb tide or flooding tide is approximately 3,142 cubic feet for a total of approximately 125,680 cubic feet for all the cylinders 54.

The flow control system 42 is located just above the high tide location as represented in FIG. 2. The piping 56 between the flow control system 42 to the reservoir 44, the reservoir 44 and the turbine generator 48, the turbine generator 48 and the sump 46, and the sump 46 to the flow control system 42 in this embodiment is each 24 inch in diameter.

The reservoir 44 has a volume of approximately 300,000 cubic feet for holding the working fluid 52. The reservoir 44 can be various shapes such as surface area of approximately 122 feet by 122 feet or circular having a radius of approximately 70 feet.

The sump 46 is formed of concrete and has a height of 20 feet. The sump has a volume of approximately 300,000 cubic feet for holding the working fluid 52. The shape can be various shapes such as surface area of approximately 122 feet by 122 feet or circular having a radius of approximately 70 feet. The piping 56b from the sump 46 to the flow control 42 travels from near the bottom of the sump and has a minimum vertical height change. As indicated above, this is an illustration and the sizing of components would depend on numerous factors including the site and the desire output.

The energy generated from the tide activated system 30 is from conversion of tidal energy to potential energy of the working fluid 52 in the reservoir 44. The potential energy is converted into rotational energy in the turbine and then electrical energy in one embodiment. The greater the potential energy of the working fluid 52 in the reservoir 44, that is the pressure head 60, the greater energy that can be generated from the tide activated system 30.

In that the amount of working fluid 52 forced into the reservoir 44 will vary dependent on the location in the tidal period, the level of the working fluid 52 in the reservoir 44 will fluctuate as the working fluid 52 forced to the reservoir 44 varies. Because of the variation in flow, the reservoir 44, the sump, and the other components that hold the working fluid 52, including the turbine generator, the flow control system, and the cylinders are part of a working fluid compensation system.

The average height or pressure head 60 above the turbine generator 48 is 250 feet in this example. As way of an example, the flow control system 42 is no less than 5 feet over the average high tide level. The bottom level of the sump 46 is no less than 5 feet higher in elevation than the flow control system 42. In that the sump 46 has an average height of working fluid 52 of 20 feet, the average depth of the level of the working fluid in the sump 46 is 25 feet above average high tide. The input port of the turbine generator 48 is 5 feet above the average height of the level of the working fluid in the sump 46. Therefore the working fluid 52 needs to be pumped approximately 290 feet to the reservoir 44 by the movement of the piston 68 in the respective cylinders 54.

The reservoir 44 has a volume of approximately 300,000 cubic feet for holding the working fluid 52. The shape can be various shapes such as surface area of approximately 122 feet by 122 feet or a circular having a radius of approximately 70 feet.

The turbine generator 48 consumes the working fluid 52 at a rate of 50 gallons/second. While the specific embodiment of the system 30 would be designed such that the nominal flow rate into the reservoir 44 will equal the flow rate out of the reservoir 44 and into the turbine generator 48 for a time equaling multiple tidal periods, it is recognized and discussed above that the tidal patterns will vary. The system 30 can have a second turbine generator 208 and/or a by-pass pipe 210 from the reservoir 44 to the sump 46 to compensate for variations as seen in FIG. 1

In the flow control system 42, the check valves 112, 114, 116, and 118 are clapper check valves in one embodiment. It is recognized that other styles of check valves can be used including a ball check valve in which a movable spherical ball blocks the flow. Another alternative is a swinging butterfly-style check valve.

Figure 13:
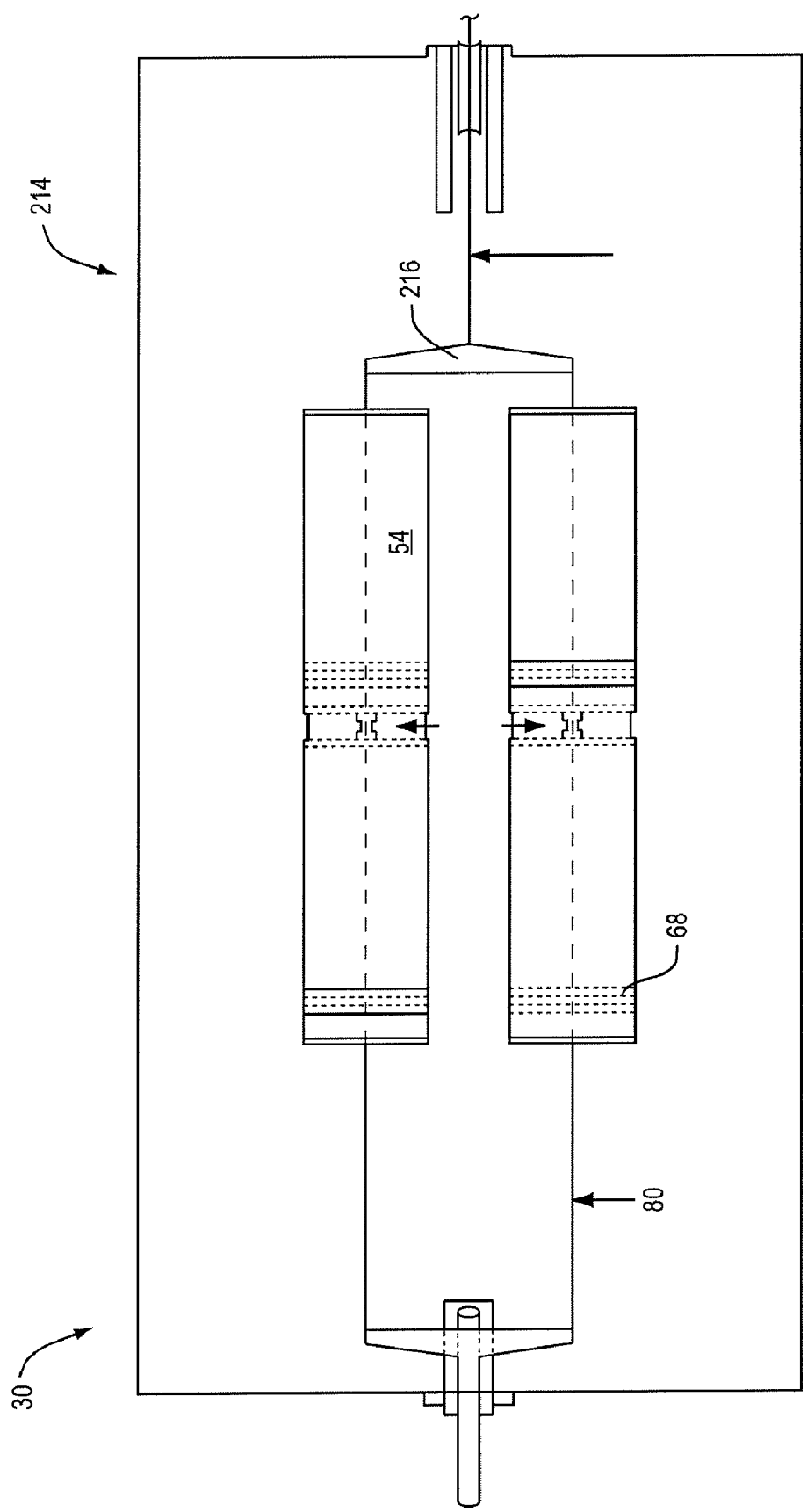
FIG. 13 is an alternative embodiment of a float/weight barge of the tide activated system of the present invention.

Referring to FIG. 13, an alternative embodiment of a float/weight barge 214 of the tide activated system 30 is shown. The float/weight barge 214 shows a series of cylinders 54 that are smaller relative to the size of the float/weight barge 214 than in the above embodiment. Two sets of cylinders 54 are in parallel. Each set has a shaft 80. The float/weight barge 214 has a pair of swingletrees 216 that connect the shafts 80 to the pumping cable system 92.

The tide moving the float/weight barge 214 either up or down as the tide ebbs and floods forces the working fluid 52 from the cylinders 54 to the flow control system 42, such as seen in FIG. 1. The smaller cylinders 54 will result in a lower center of gravity of the float/weight barge 214 than the float/weight barge 40 of FIGS. 2-4C.

Figure 14:
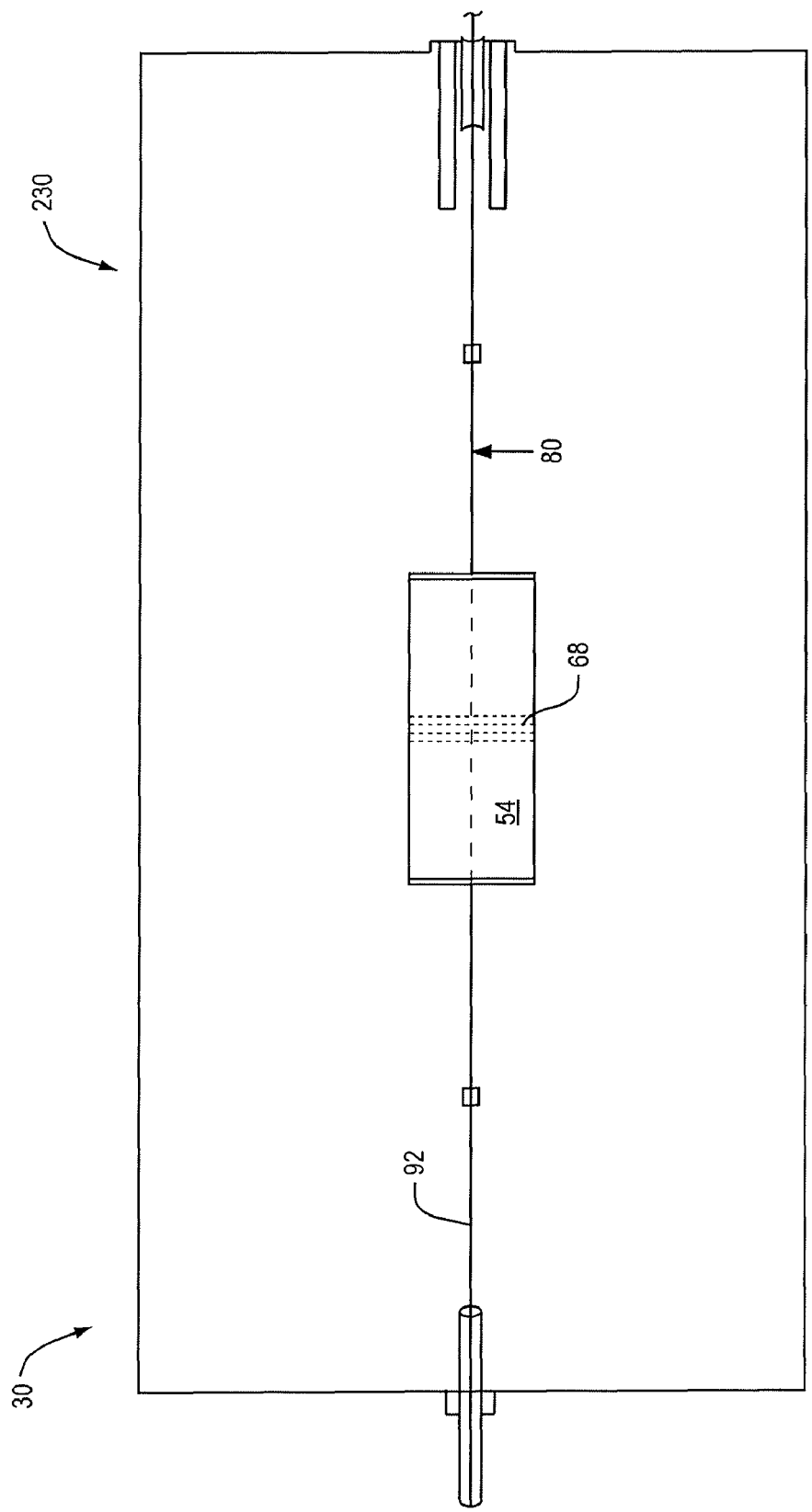
FIG. 14 is another alternative embodiment of a float/weight barge of the tide activated system of the present invention.

Referring to FIG. 14, another alternative embodiment of a float/weight barge 230 of the tide activated system 30 is shown. The float/weight barge 230 has a single cylinder 54 with a single piston 68. FIGS. 13 and 14 show that the cylinders 54 can be arranged in various configurations on the float/weight barge 40, 214, 230 in the tide activated system 30.

Figure 15:
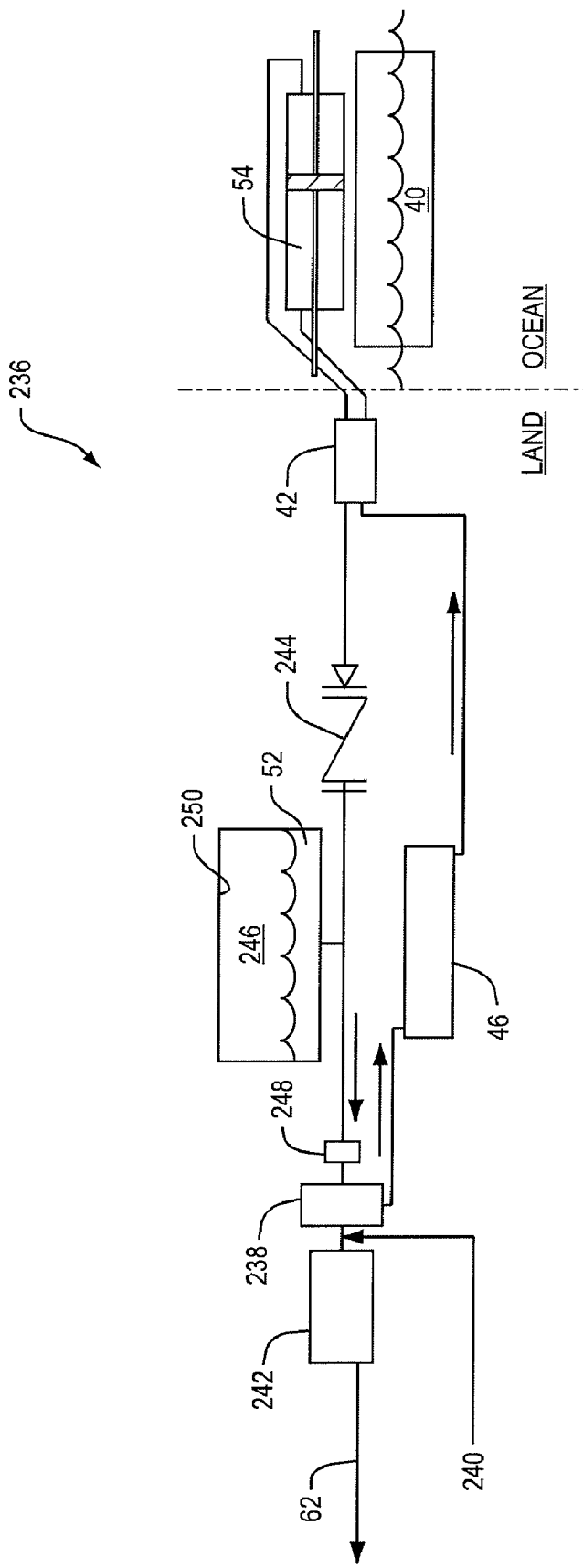
FIG. 15 is a schematic overview of an alternative embodiment of the tide activated system including a pneumatic system.
Figure 16:
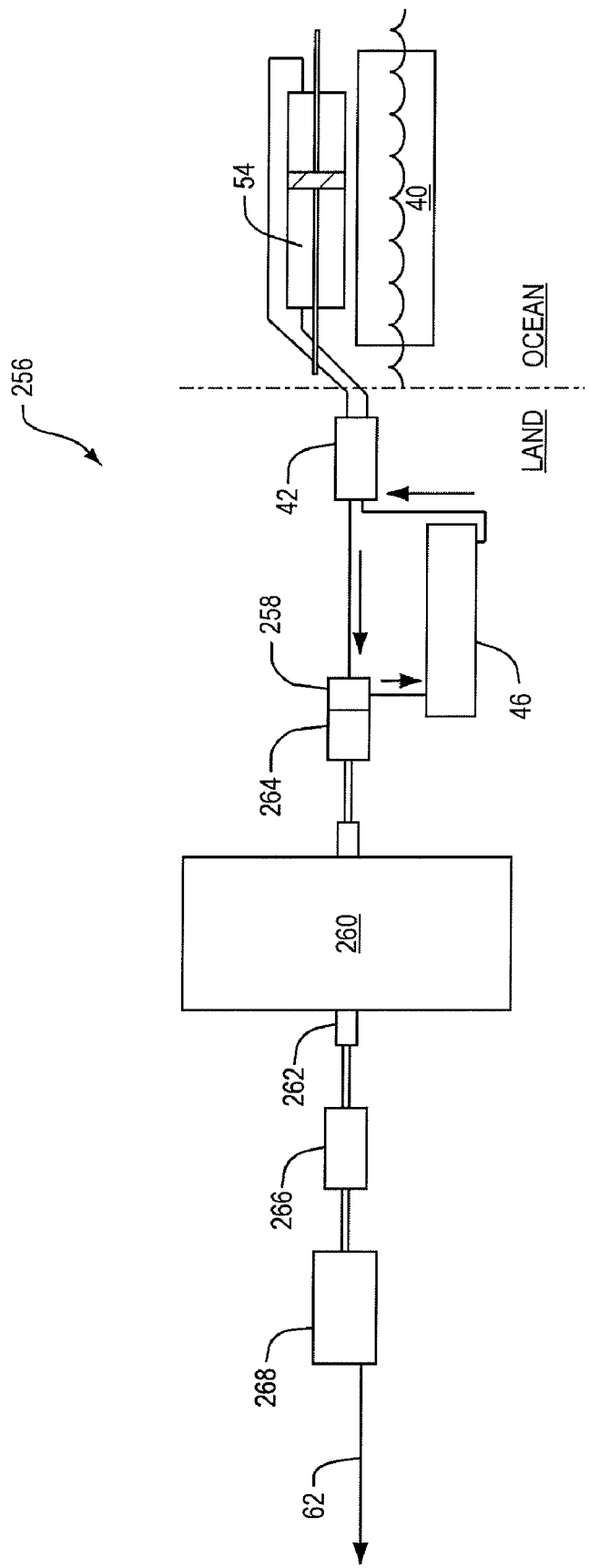
FIG. 16 is a schematic overview of an alternative embodiment of the tide activated system including a fly-wheel system.
Figure 17:
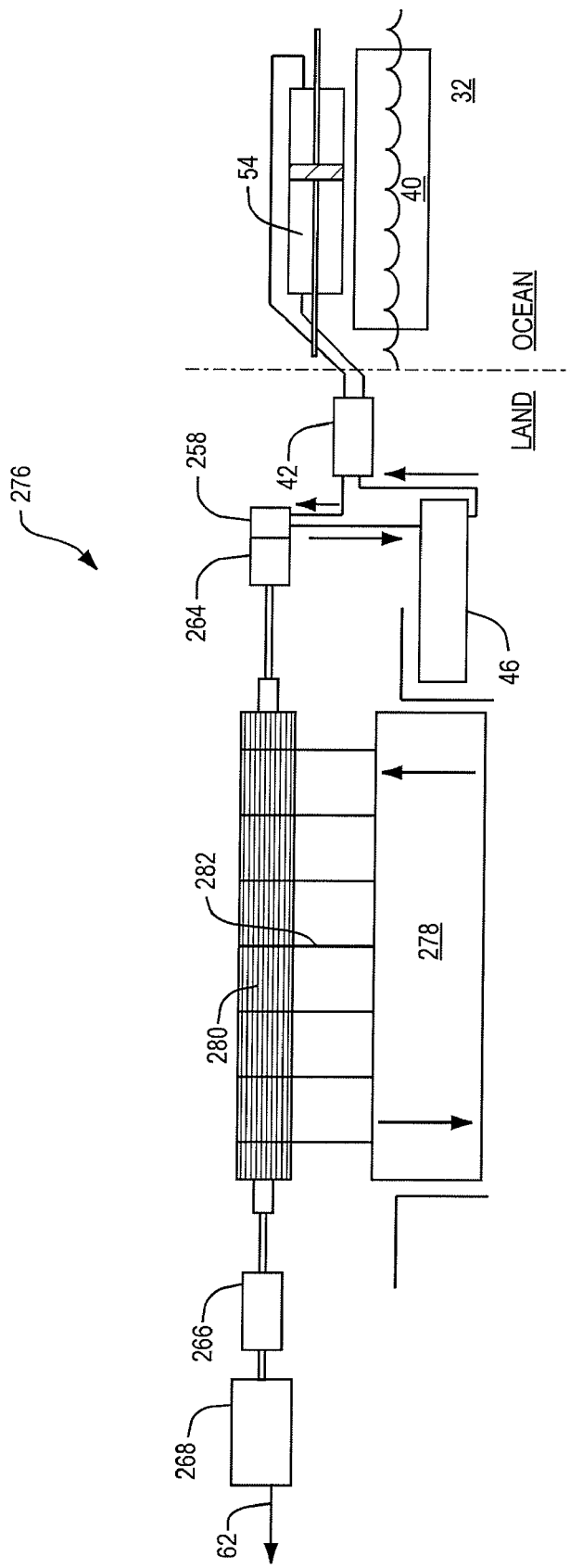
FIG. 17 is a schematic overview of an alternative embodiment of the tide activated system including a dead weight system.

While the embodiments described above use a reservoir 44 to compensate in fluctuation in the working fluid 52 because of different rates during different times of the tide period and different tidal ranges, it is recognized that other mechanisms can be used to compensate for the fluctuations in the working fluid 52, that is act as an accumulator. FIGS. 15-17 show three alternative embodiments in which the fluctuating flow of working fluid 52 is stored in a way to have a constant flow to generate power.

Referring to FIG. 15, a schematic overview of an alternative embodiment of the tide activated system 236 including a pneumatic system is shown. Similar to the previous embodiments, the system 236 has a float/weight barge 40 with at least one cylinder 54 and a flow control system 42. The system 236 has a hydraulic motor 238 that converts the force of the working fluid 52 into rotational energy in a power shaft 240. The power shaft 240 drives an electric generator 242 that produces electrical energy as represented by arrow 62.

Interposed between the hydraulic motor 238 and the flow control system 42 in the direction of the flow from the fluid control system 42 to the hydraulic motor 238 is a check valve 244, a pneumatic accumulator 246, and a hydraulic governor 248. The check valve 244 prevents the working fluid 52 from flowing in the opposite direction.

The system 236 forces working fluid 52 towards the hydraulic motor 238 from the flow control system. During portions of the tidal period, the system 236 then can be used by the electrical generator 242 as controlled by the hydraulic governor 248. The excess working fluid 52 will then be forced into the pneumatic accumulator 246, the expansion tank. The pneumatic accumulator 246 has air 250 above the working fluid 52. The air 250 in the expansion tank 246 is compressed by the working fluid 52 and thus accumulates energy that is used during slack tides (high and low), to run the generator 242, when no working fluid 52 is being pumped. The hydraulic governor 248 regulates the flow of the working fluid 52 to the hydraulic motor 238.

Still referring to FIG. 15, similar to the embodiment shown in FIG. 2, the system 236 has a sump 46. The sump 46 works similar to the sump 46 described with respect to FIGS. 1 and 2 as part of the working fluid compensation system 190.

Referring to FIG. 16, a schematic overview of an alternative embodiment of the tide activated system 256 including a fly-wheel system is shown. Similar to the previous embodiments, the system 256 has a float/weight barge 40 with at least one cylinder 54 and a flow control system 42. The working fluid 52 from the flow control system 42 is piped to and drives an hydraulic motor 258. The working fluid 52 is then fed into a sump 46 which acts like the sumps in the previous embodiments.

In contrast to the previous embodiment, the hydraulic motor 258 will not receive a uniform flow of working fluid 52. The system 256 has a large fly-wheel 260 mounted on a set of rollers or ball bearings 262. The hydraulic motor 258, which does not rotate at a constant speed, inputs power to the fly-wheel 260 through an automatic transmission 264 attached to the pivot point of the fly-wheel 260. On the opposite side of the fly-wheel 260, also attached to the pivot point, is a power take-off transmission 266 which energizes an electric generator 268. The power take-off transmission 266 maintains a constant RPM and the required torque to operate the generator 268.

Similar to previous embodiments, the system 256 accumulates energy so that during slack tides, both low and high, the system 256 can continue to generate power. In the embodiment discussed with respect to FIGS. 1, 2, and 5, a reservoir 44 act as an accumulator. In this embodiment shown in FIG. 16, the accumulated rotational force of the fly-wheel 260 is capable of maintaining operation of the electric generator 268 by automatic changes in the transmission 266 as the fly-wheel's 260 accumulated energy is diminished by lack of in-put. That lost power is recovered as tidal movement returns and the float/weight barges 40 fall or rise in the ebb or flooding tide resulting in the working fluid 52 being pumped through the flow control system 42 to operate the hydraulic motor 258 in the tide activated system 256. In an embodiment, it is contemplated that the fly-wheel 260 will be several tons.

Referring to FIG. 17, a schematic overview of an alternative embodiment of the tide activated system 276 including a dead weight system 278 is shown. Similar to the previous embodiments, the system 276 has a float/weight barge 40 with at least one cylinder 54 and a flow control system 42. Similar to the previous embodiment described with respect to FIG. 16, the working fluid 52 from the flow control system 42 is piped to and drives an hydraulic motor 258. The working fluid 52 is then fed into a sump 46. In addition, the hydraulic motor 258 will not receive a uniform flow of working fluid 52. The hydraulic motor 258 is connected to an automatic transmission 264 in the tide activated system 276.

The system 276 has a round drum 280 that has a plurality of suspension chains 282 that carry a weight 278. The drum 280 is rotated by a series of gears in the transmission 264 and the hydraulic motor 258 as the float/weight barges 40 fall or rise in the ebb or flooding tide in the lagoon 32. The rotation of the drum 280 slowly lifts the weight 278. The drum 280, like the fly-wheel 260 in the previous embodiment, is connected to a power take-off transmission 266 which energizes an electric generator 268.

In periods of slack tide, the weight 278 falls slowly to energize the generator 268 through the automatic transmission 266 providing the required RPM and torque. During periods when the generator 268 is operating and there is tidal movement, ebbing or flooding, the weight 278 may stand still at times as it is being raised at the same rate it is falling. This system 276 requires three gears and a continuous chain: one gear to power the generator 268 through the power take-off transmission 266 as the weight 278 falls, one gear to lift the weight 278 with power provided by the movement of the float/weight barge 40 through the hydraulic motor 258 and the automatic transmission 264, and one gear as an idle gear to hold the idle chain 282.

Figure 18:
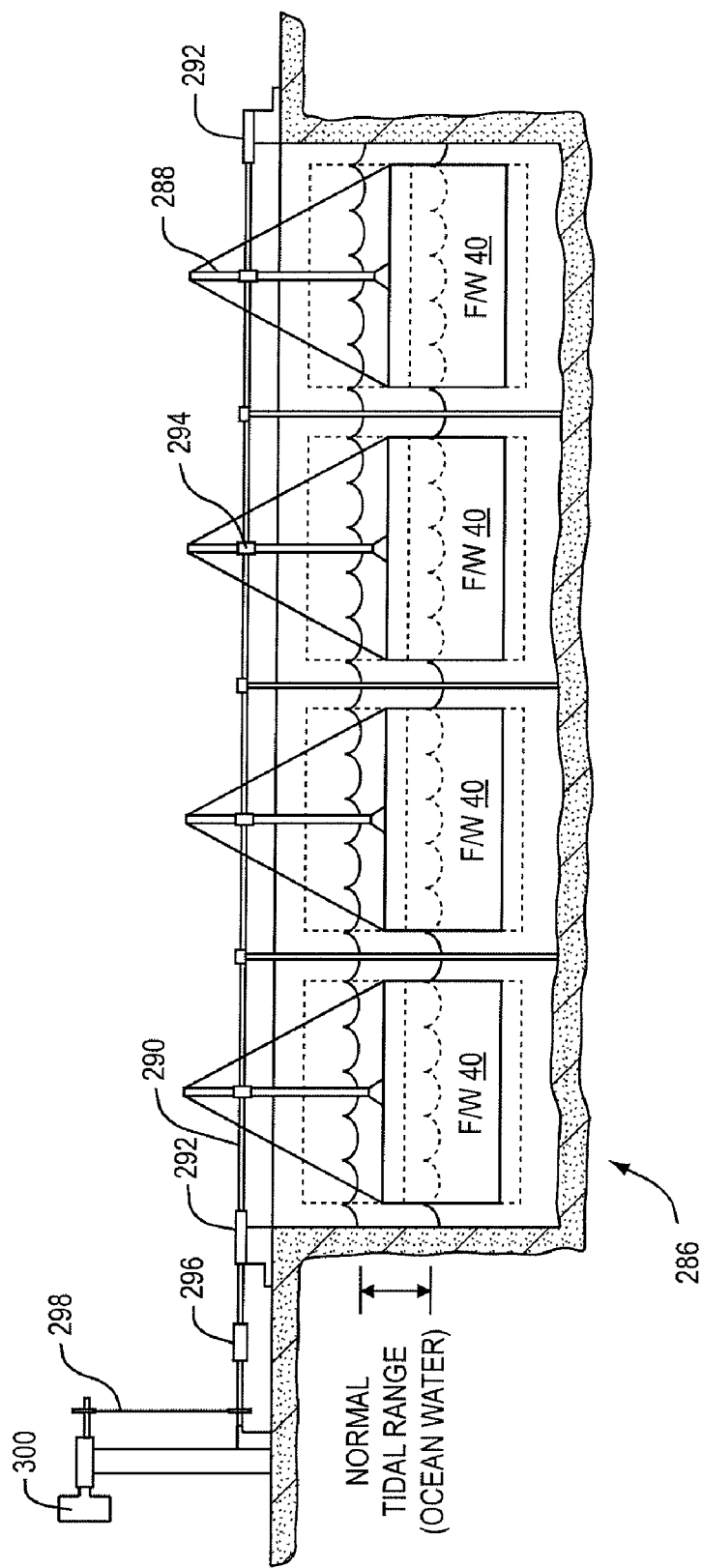
FIG. 18 is a sectional front elevation of an alternative embodiment of a tide activated system.

Referring to FIG. 18, a sectional front elevation of an alternative embodiment of a tide activated system 286 is shown. The system 286 has float/weight barges 40, that in contrast to the previous embodiments which have cylinders 54, such as seen in FIG. 3A, the system 286 has a mast 288 that projects upward from the float/weight barges 40. The system 286 has a drive pipe 290 that extends over the lagoon 32. The drive pipe 290 is capable of rotating and is carried by a pair of rolling bearings 292. A gear/shaft power take-off mechanism 294 is used to rotate the drive pipe 292 as the float/weight barges 40 move up and down in the lagoon 32 with the ebbing and flooding tide as explained below with respect to FIGS. 21A-22B.

Still referring to FIG. 18, the drive pipe 290 through a transmission 296 drives a pulley and chain mechanism 298 to a power accumulator 300. The power accumulator 300 can drive a round drum 280 and weight 278 such as shown in FIG. 17. In a preferred embodiment, the transmission 296 has a ratchet mechanism resulting in rotation in one direction.

Figure 19:
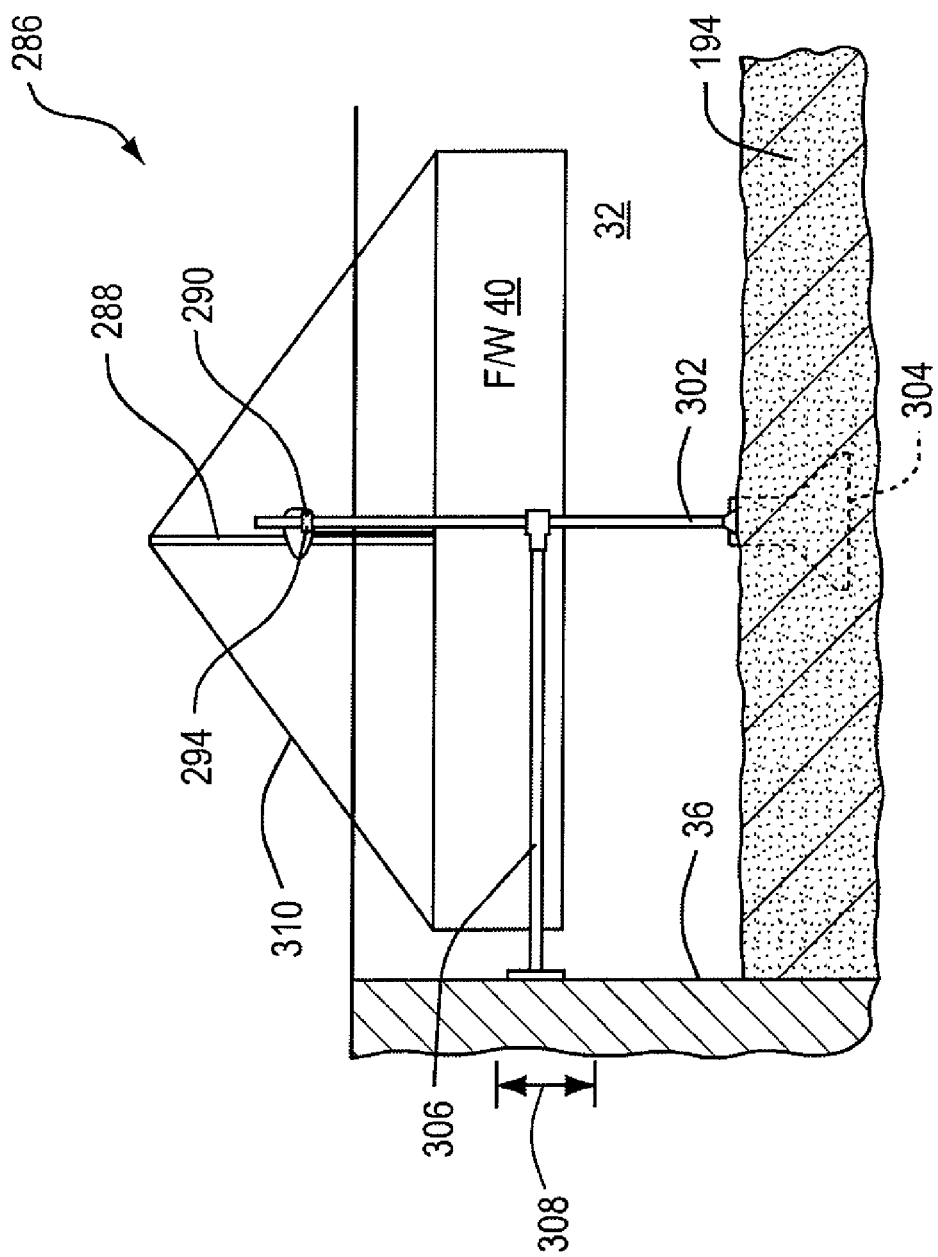
FIG. 19 is a sectional side elevation of the alternative embodiment of the tide activated system of FIG. 18.

Referring to FIG. 19, a sectional side elevation of the alternative embodiment of the tide activated system 286 of FIG. 18 is shown. In that the drive (power) pipe 290 extends a sufficient length over the lagoon 32; support is needed. The system 286 has a power pipe support 302 which extends from a pipe support footing 304 in the ground, the base 194, to at least the level of the drive (power) pipe 290. The system 286 has a horizontal brace 306 that extends from the sea wall 36 to the power pipe support 302. The normal tidal range is represented by arrow 308.

The system 286 has a plurality of stays 310 to support the mast 288. The gear/shaft power take-off mechanism 294 is used to rotate the drive pipe 292 as the mast 288 moves with the float/weight barges 40 up and down in the lagoon 32 with the ebbing and flooding tide.

Figure 20:
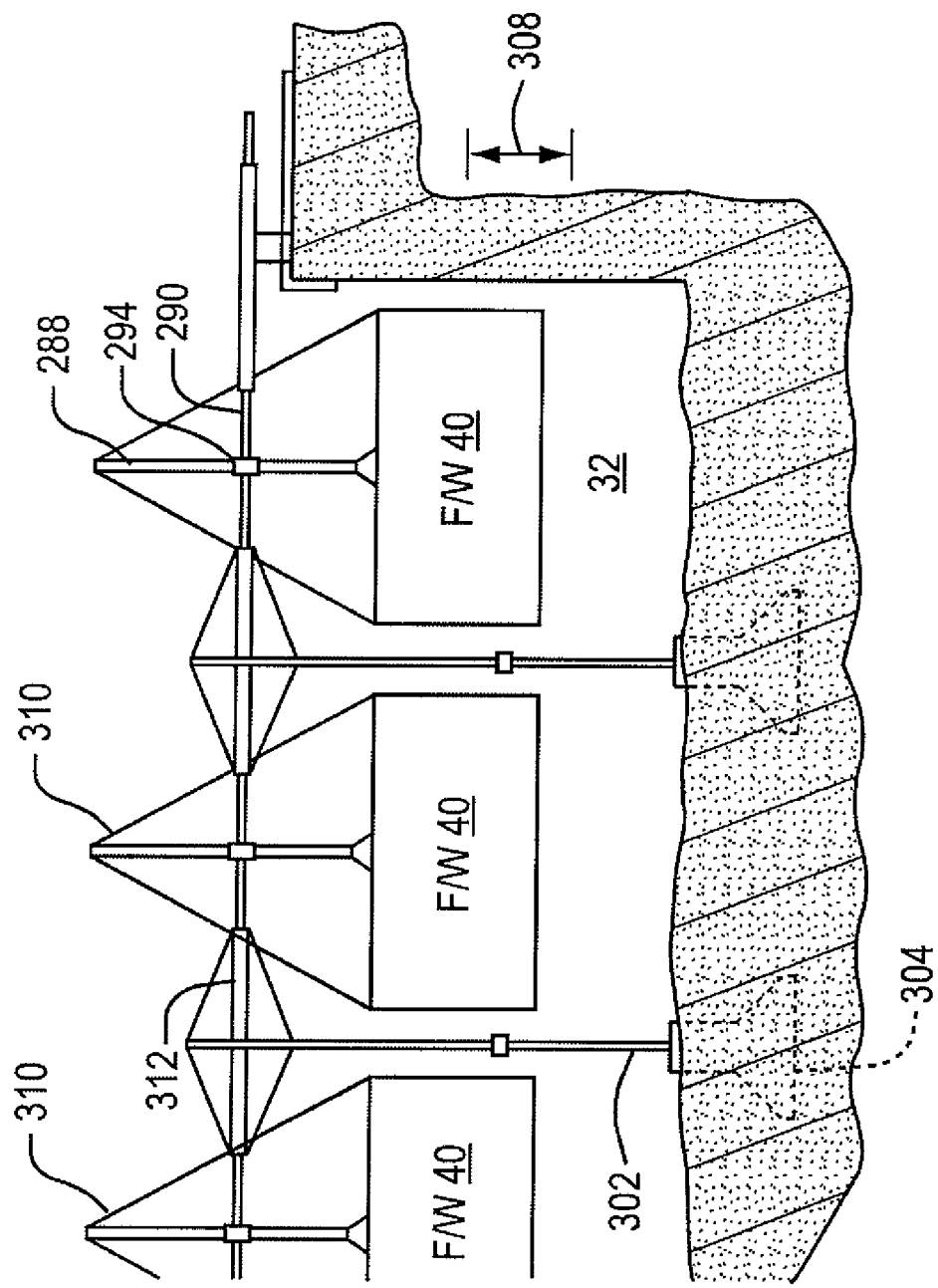
FIG. 20 is a sectional view of a portion of the front elevation of the alternative embodiment of the tide activated system of FIG. 18.

Referring to FIG. 20, a sectional view of a portion of the front elevation of the alternative embodiment of the tide activated system 298 of FIG. 18 is shown. The power pipe support 302 of the system is shown extending from the pipe support footing 304 to above the level of the drive (power) pipe 290. The power pipe support 302 is shown with a horizontal support portion 312 that encircles the drive pipe 290; the horizontal support portion 312 has a series of bearings to allow rotation of the drive pipe 290.

The gear/shaft power take off mechanism 294 is used to rotate the drive pipe 292 as the mast 288 moves with the float/weight barges 40 up and down in the lagoon 32 with the ebbing and flooding tide. The plurality of stays 310 support the mast 288.

Figure 21B:
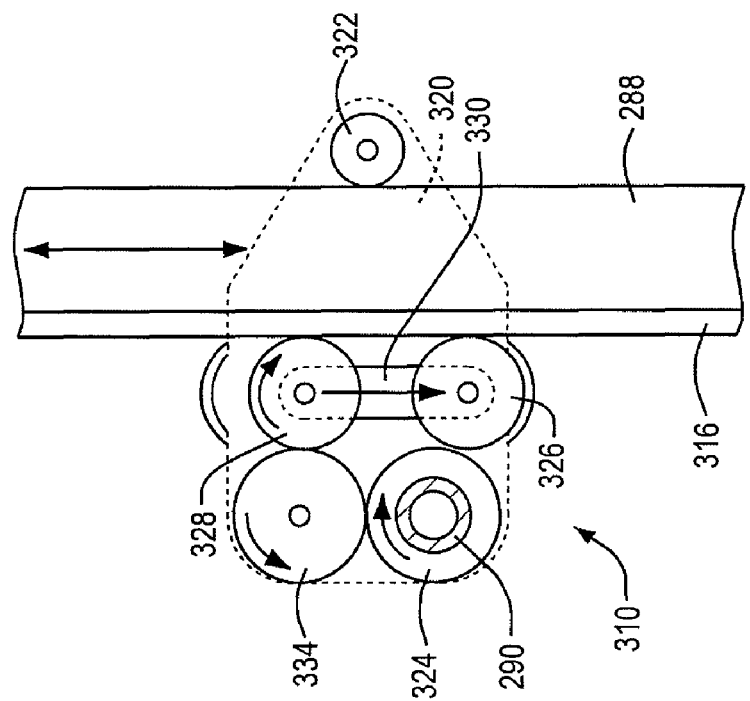
FIG. 21B is a side view of a power drive system of the alternative embodiment of the tide activated system of FIG. 18.
Figure 21A:
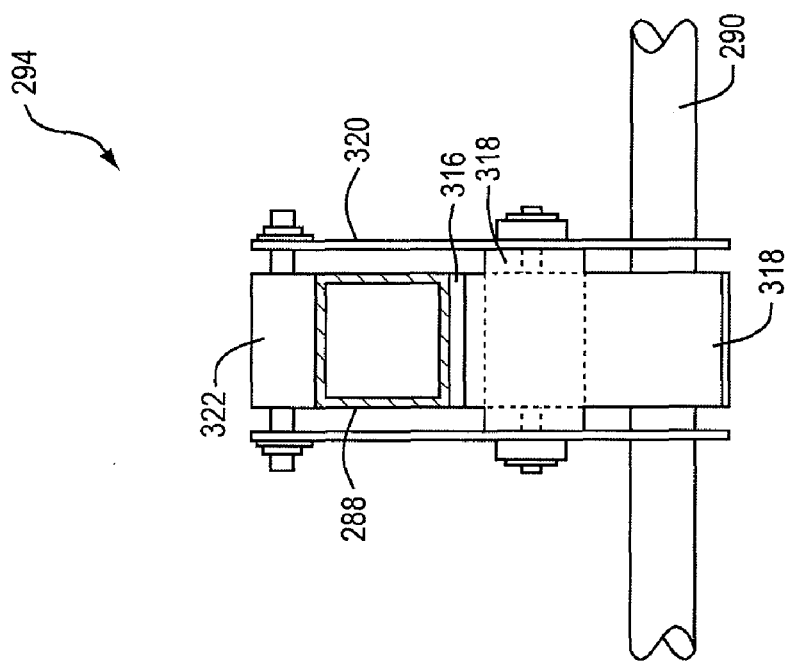
FIG. 21A is a plan view of a power drive system of the alternative embodiment of the tide activated system of FIG. 18.

Referring to FIG. 21A, a plan view of the gear/shaft power take off mechanism or power drive system 294 of the alternative embodiment of the tide activated system 286 of FIG. 18 is shown. The power drive system 294 converts the vertical motion of the mast 288 to rotate the power pipe 290. The mast 288 has a rack 316 with a series of teeth. The power drive system 294 has a series of gears 318 that rotate as the mast 288 moves upward and downward as the tide floods and ebbs. The power drive system 294 has a pair of plates 320 and a rubber wheel 322 to align and position the gears.

Referring to FIG. 21B, a side view of a power drive system 294 is shown. The drive (power) pipe 290, the pipe 290 that extends to the transmission 296 as seen in FIG. 18, is encircled by a drive gear 324 at each mast 288. The series of gears 318 includes a pair of gears that engage the rack 316. One of the gears is a flooding tide gear 326 and the other is a reversing gear 328. The two gears, the flooding tide gear 326 and the reversing gear 328, are connected by a retainer 330 that move the gears translationally together. In an embodiment, the retainer 330 is a pair of linking bars that are secured to the flooding tide gear 326 and the reversing gear 328 and can slide vertically relative to the plates 320 that retain the drive gear 324.

Figure 22B:
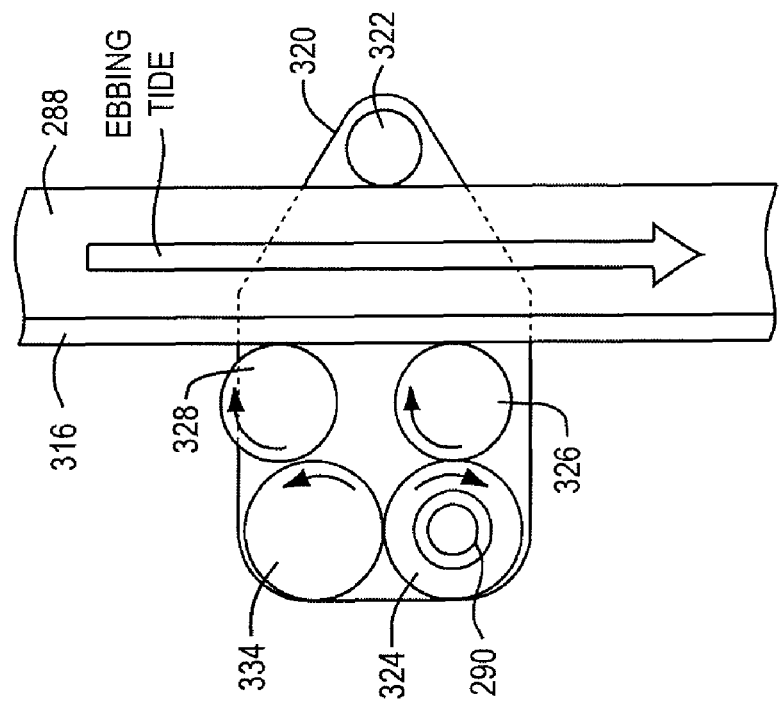
FIG. 22B is a schematic view of power drive system in the ebbing tide.
Figure 22A:
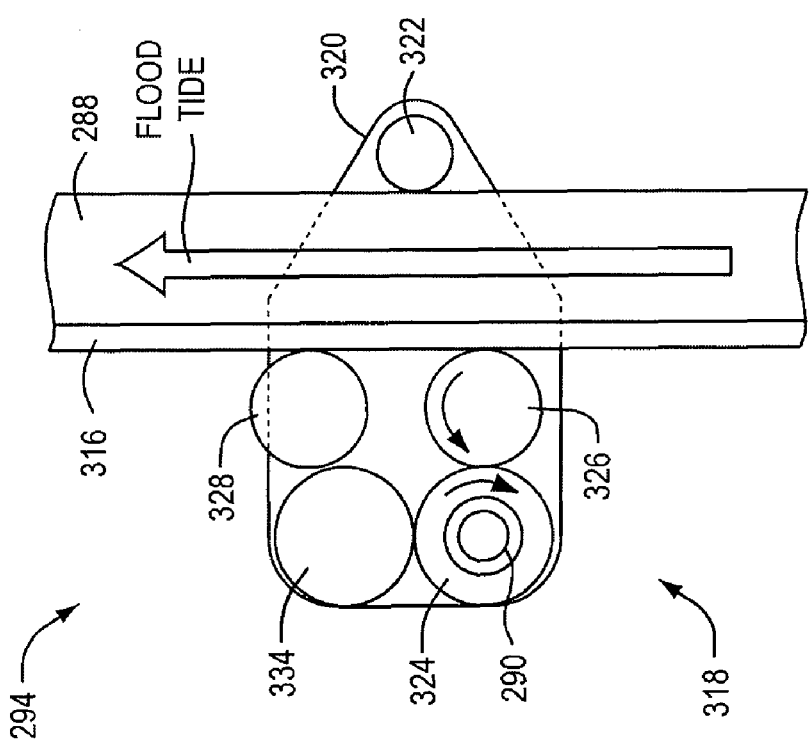
FIG. 22A is a schematic view of power drive system in the flood tide.

Referring to FIG. 22A, a schematic view of power drive system 294 in the flood tide is shown. As the tide floods in the lagoon, the float/weight barge 40 moves vertically upward, the mast 288 moves upward also. The mast 288 as it moves upward results in the flooding tide gear 326 rotating counterclockwise as its teeth engage the teeth of the rack 316 which is moving upward. The counterclockwise rotation of the flooding tide gear 326 results in the drive gear 324 and the drive pipe 290 rotating clockwise. The reversing gear 328 and an ebbing tide driving gear 334 both rotate counterclockwise; the reversing gear 328 is driven by its contact with the rack 316, the ebbing tide driving gear 334 is driven by its contact with the reversing gear 328. While both the reversing gear 328 and an ebbing tide driving gear 334 are rotating, neither gear is effecting the rotation of the drive pipe 290.

As the tide arrives at high or low tide and the tide slacks, the relative movement between the gear/shaft power take-off mechanism (power drive system) 294 and the mast 288 stops. In the case where high tide is reached and after slacking, the tide begins to ebb towards low tide and the float/weight barge 40 begins to move vertically downward. The mast 288 moves vertically downward relative to the gear/shaft power take-off mechanism 294.

Referring to FIG. 22B, a schematic view of power drive system 294 in the ebbing tide is shown. As the tide ebbs in the lagoon, the float/weight barge 40 moves vertically downward, the mast 288 moves vertically downward. As the mast 288 moves downward, both the reversing gear 328 and the flooding tide gear 326 rotate clockwise as their respective teeth engage the teeth of the rack 316 which is moving downward. The retainer 330, the linking bars that hold the flooding tide gear 326 and the reversing gear 328 slides downward when the mast 288 reverses direction from upward movement to downward movement. The retainer 330 slides down until it cannot move further relative to the pair of plates 320 of the power drive system 294. In this ebbing position, the reversing gear 328 engages the ebbing tide gear 334, which is always engaging the drive gear 324. The flooding tide gear 326 does not engage the drive gear 324 in this position. The counterclockwise rotation of the ebbing tide gear 334 results in the drive gear 324 and the drive pipe 290 rotating clockwise.

The gear/shaft power take-off mechanism (power drive system) 294 results in the drive pipe 290 rotating clockwise, as seen in the FIGS, regardless if the tide is ebbing or flowing. The power drive system 294 is similar to the flow control system 42 of other embodiments, in that both take the cyclical motion of the tides and produce a non-uniform motion in one direction. As indicated above, the drive pipe 290 can be connected via the power accumulator 300, as seen in FIG. 18, to a drum 280 and weight 278, such as shown in FIG. 17, to convert the non-uniform motion into a constant rotation to drive an electrical generator in addition to the drive pipe 290 rotating clockwise regarding if the tide is ebbing or flowing, the ratchet in the transmission 296 ensures that the power accumulator 300 only rotates in one direction.

As indicated above, the movement of the water in the lagoon 32 upward and downward is not at as a constant rate as the tide ebbs and floods. This movement that results in the movement of the working fluid 52 through the flow control system 42 or rotation of the drive pipe 290 is not at a uniform rate. This non-uniform motion or unsteady motion is converted to a steady or uniform force through the accumulator.

In an embodiment, the mast 288 is steel post that is 12 inches square with a hollow center having a ¾ of an inch thick outer wall. The drive pipe 290 is made of similar material used for well or oil drilling. The rack 316 is made of stainless steel. The stays 310 are formed of steel cable.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

While tides and tidal periods of oceans and seas are discussed it is recognized that other motions can be used. For example, man-made changes in the level of water, such as in a lock, could be used in the generation of power. A lock system could have a portion where ships/barges do not pass through that contains a float/weight barge 40 that moves up and down with level of the water in the lock. This motion-activated system derives energy from the rise and fall of the level of the body of the water.

In an embodiment where the motion is not from a tide, the flooding tide gear 326 and the ebbing tide gear 334 of the motion-activated system would more properly be called an ascending water level gear 326 and descending water level gear 334 respectively.

Furthermore, while the body of water is typically salt or sea water in an ocean or a lagoon associated with the ocean, it is recognized that body of water could be river water as associated with the locks above. Furthermore it is contemplated that the body of water could be other liquids.

For example, a reverse osmosis (RO) separator can be used to create the working fluid from sea water. The reverse osmosis separator can be powered by the electrical energy 62 from the turbine generator 48. By reverse osmosis, fresh water can be created from sea water to compensate for losses of working fluid through evaporation or leaks.

It is recognized that the reservoir 44 and the sump 46 can either be open or closed on the upper surface to minimize evaporation. Both the reservoir 44 and the sump 46 in the embodiments shown are will be open to the atmosphere.

While it is contemplated that the channel 34 to the lagoon 32 have locks to limit flow of water 20 in the lagoon 32 during storms, it is recognized that in the alternative if a storm or other event is going to occur that would result in the tidal range exceeding the capacity of the tide activated system 30, the shaft 80 with the pistons 68 can be decoupled from the pumping cable system 92 to prevent movement of the pistons 68 as the float/weight barge 40 moves up and down.

It is recognized that the ballast section 160, such as shown in FIG. 11, can have tanks into which working fluid 52 can be pumped to adjust the ballast. For example, the ballast section 160 can be heavier (i.e., additional working fluid) during a falling tide and lighter during a rising tide to assist in the movement of the barge 40 in the correct direction and force on the working fluid in the variable size chamber 70 by the piston 68.

It is recognized that the turbine 48 instead of generating electricity can be used to drive a device with the rotation of the turbine.

It is recognized that the channel 34 to the lagoon 32 can have locks that open and close to protect the tide activated system 30 in extreme weather.

All installations of this invention are different as determined by site conditions including; tidal range, terrain (above and below the oceans surface), and the target of power production.

In addition to these factors, the size, capacity, gearing, clutches, sequencing, and placement of all required elements are installation specific. These and other givens are factors of design in all installations.

It is desirable to have the pistons achieve useful pumping pressure as soon as possible after the tide starts to move (flooding or ebbing). The combined Float/Weight pumps must overcome the back pressure imposed on the system by the weight of the working fluid in the line(s) from the flow control up to the reservoir. This will be done by minimal tidal movement. That movement times the total Float/Weight Barges collective footprint that represents the displaced water in the lagoon (and its weight) that is exerting pressure on the working fluid in the line(s) to the reservoirs. Thus, the total footprint of all of the barges as determined during the design stage will determine that capacity.

What is claimed is:

1. A tide activated system for deriving energy from the periodic rise and fall of the level of a body of water, the system comprising:
   a float/weight barge for rising and falling with the level of the body of the water, the float/weight barge having
      a cylinder having a chamber, the chamber holding a piston movable in the chamber defining a pair of variable size chambers;
      a shaft extending through the chamber, the shaft extending through and connected to the piston for moving the piston within the chamber of the cylinder for varying the size of the pair of variable size chambers of the cylinder;
      a cable guide system having a series of pulleys; and
      a buoyancy and weight system for maintaining stability of the float/weight barge as the float/weight barge rises and falls;
   a pumping cable system interacting with at least a pair of pulleys of the cable guide system, the pumping cable system including the shaft extending through the chamber, wherein the movement of the float/weight barge in the rising and falling water moves the piston in the cylinder varying the size of the pair of variable size chambers;
   a working fluid;
   a turbine having a working fluid input port, a working fluid output port, and a series of blades for interacting with the working fluid for converting the energy from the working fluid into another form of energy; and
   a flow control system for directing working fluid forced from the variable size chamber that is decreasing in size as the barge rises or falls towards the turbine and directing working fluid from the turbine to the variable size chamber that is increasing in size as the barge rises or falls wherein the rise and fall of the level of the body of water results in the rise and fall of the barge therein moving the piston back and forth in the cylinder forcing fluid out of one side of the variable size chamber and then other side of the variable size chamber as the other side is filled.

2. A tide activated system of claim 1 wherein the cylinder on the float/weight barge is at least two cylinders in series, each chamber holding a piston movable in the chamber defining a pair of variable size chambers, wherein the shaft extends through the chambers of each of the cylinders and is connected to the piston for moving the piston within the chamber of the cylinder for varying the size of the pair of variable size chambers of the cylinder.

3. A tide activated system of claim 1 further comprising a working fluid compensation system, a working fluid compensation system including:
   a reservoir for retaining the fluid from the cylinders, the reservoir located at a higher elevation than the turbine;
   a sump at an elevation below the turbine and above the float/weight barge for holding fluid from the turbine, where the turbine is at an elevation below the reservoir and above the sump; and
   the turbine, the flow control system; and the variable size chambers.

4. A tide activated system of claim 3 further comprising:
   a lagoon in communication with the body of water by a channel, the lagoon having a perimeter sea wall enclosing the lagoon and a central sea wall positioned in the lagoon and connected to the perimeter sea wall by a causeway, wherein the central sea wall is interposed between the channel between the lagoon and the body of water and the float/weight barge.

5. A tide activated system of claim 4 wherein the float/weight barge is a plurality of float/weight barges carried in the lagoon for rising and falling with the level of the body of water, each of the float/weight barges having
   at least one cylinder having a chamber, the chamber holding a piston movable in the chamber defining a pair of variable size chambers; and
   a shaft extending through the chamber, the shaft extending through and connected to the piston for moving the piston within the chamber of the cylinder for varying the size of the pair of variable size chambers of the at least one cylinder.

6. A tide activated system of claim 4 wherein the float/weight barge has a cable guide system that has at least a pair of pulleys and the system further comprising a stabilizing cable system interacting with at least a pair of pulleys of the cable guide system, wherein the stabilizing cable system in cooperation with the pumping cable system maintains the float/weight barge in generally a horizontal plane as the float/weight barge rises and falls in the lagoon.

7. A tide activated system of claim 3 wherein the working fluid compensation system is a closed system and the working fluid is fresh water.

8. A tide activated system of claim 1 wherein the turbine is a turbine generator for generating electrical energy.

9. A tide activated system of claim 1 wherein the flow control system comprises:
   a pair of chamber pipes, each chamber pipe connected to one of the pair of variable size chambers of the cylinder on the float/weight barge and an end connected to a first tee connection;
   a turbine input pipe, the turbine input pipe for directing the flow of the working fluid towards the turbine and an end connected to a second tee connection;
   a turbine output pipe, the turbine output pipe for directing the flow of the working fluid from the turbine and an end connected to a third tee connection;
   a first connection pipe between one of the first tee connections and the second tee connection, the first connection pipe having a first check valve for allowing flow only from the variable size chamber to the turbine input pipe;
   a second connection pipe between one of the first tee connections and the third tee connection, the second connection pipe having a second check valve for allowing flow only from the turbine output pipe to the variable size chamber;
   a third connection pipe between the other of the first tee connections and the second tee connection, the third connection pipe having a third check valve for allowing flow only from the variable size chamber to the turbine input pipe; and
   a fourth connection pipe between the other of the first tee connections and the third tee connection, the fourth connection pipe having a fourth check valve for allowing flow only from the turbine output pipe to the variable size chamber wherein the flow is from the variable size chambers to the working fluid input port of the turbine and the flow is from the working fluid output port of the turbine to the variable size chambers regardless of whether the level of the body of water is rising or falling.

10. A tide activated system for deriving energy from the periodic rise and fall of the level of a body of water, the system comprising:
a float/weight barge for rising and falling with the level of the body of the water, the float/weight barge having
at least two cylinders in series, each cylinder having a chamber, the chamber holding a piston movable in the chamber defining a pair of variable size chambers;
a shaft extending through the chambers, the shaft extending through and connected to the pistons for moving the pistons within the chamber of the respective cylinder for varying the size of the pair of variable size chambers of the at least two cylinders;
a cable guide system having a series of pulleys; and
a buoyancy and weight system for maintaining stability of the flood/weight barge as the float/weight barge rises and falls;
a pumping cable system interacting with at least a pair of pulleys of the cable guide system, the pumping cable system including the shaft extending through the chambers, wherein the movement of the barge in the rising and falling lagoon moves the piston in the cylinder varying the size of the pair of variable size chambers;
a working fluid;
a working fluid compensation system including:
a reservoir for retaining the working fluid, the reservoir located at a higher elevation than the float/weight barge;
a turbine generator for generating electrical power, the turbine generator at an elevation below the reservoir and above the float/weight barge, the turbine generator having a working fluid input port, a working fluid output port, and a series of blades for interacting with the working fluid for converting the energy from the working fluid into electrical energy;
a sump at an elevation below the turbine generator for holding the working fluid from the turbine generator;
a flow control system for directing working fluid forced from the variable size chamber that is decreasing in size as the float/weight barge rises or falls to the reservoir and directing working fluid from the sump to the variable size chamber that is increasing in size as the float/weight barge rises or falls wherein the rise and fall of the level of the body of water results in the rise and fall of the barge therein moving the piston back and forth in the cylinder forcing fluid out of one side of the variable size chamber and then other side of the variable size chamber as the other side is filled.

11. A tide activated system of claim 10 wherein the float/weight barge is a plurality of float weight barges for rising and falling with the level of the body of water, each of the float/weight barges having
at least two cylinders in series, each cylinder having a chamber, the chamber holding a piston movable in the chamber defining a pair of variable size chambers; and
a shaft extending through the chambers, the shaft extending through and connected to the pistons for moving the pistons within the chamber of the cylinder for varying the size of the pair of variable size chambers of the at least two cylinders.

12. A tide activated system of claim 11 further comprising:
a lagoon in communication with the body of water by a channel, the lagoon having a perimeter sea wall enclosing the lagoon and a central sea wall positioned in the lagoon and connected to the perimeter sea wall by a causeway, wherein the central sea wall is interposed between the channel between the lagoon and the body of water and the float/weight barge.

13. A tide activated system of claim 12 wherein the float/weight barge has a cable guide system that has at least a pair of pulleys and the system further comprising a stabilizing cable system interacting with at least a pair of pulleys of the cable guide system, wherein the stabilizing cable system in cooperation with the pumping cable system maintains the float/weight barge in generally a horizontal plane as the float/weight barge rises and falls in the lagoon.

14. A tide activated system of claim 13 wherein the working fluid compensation system is a closed system and the fluid is fresh water.

15. A tide activated system of claim 14 wherein the fresh water is created to replenish losses.

16. A tide activated system of claim 15 further comprising a reverse osmosis separation process device powered by electrical energy from the turbine generator to create the fresh water to replenish losses.

17. A tide activated system of claim 11 wherein each of the pistons is breakable into a plurality of segments and each of the cylinders has at least one access port through which the segments of the piston can pass for maintenance.

18. A tide activated system of claim 11 wherein the flow control system comprises:
a pair of chamber pipes, each chamber pipe connected to one of the pair of variable size chambers of the cylinder on the float/weight barge and an end connected to a first tee connection;
a reservoir input pipe, the reservoir input pipe for directing the flow of the working fluid towards the reservoir and an end connected to a second tee connection;
a sump output pipe, the sump output pipe for directing the flow of the working fluid from the sump and an end connected to a third tee connection;
a first connection pipe between one of the first tee connections and the second tee connection, the first connection pipe having a first check valve for allowing flow only from the variable size chamber to the reservoir input pipe;
a second connection pipe between one of the first tee connections and the third tee connection, the second connection pipe having a second check valve for allowing flow only from the sump output pipe to the variable size chamber;
a third connection pipe between the other of the first tee connections and the second tee connection, the third connection pipe having a third check valve for allowing flow only from the variable size chamber to the reservoir input pipe; and
a fourth connection pipe between the other of the first tee connections and the third tee connection, the fourth connection pipe having a fourth check valve for allowing flow only from the sump output pipe to the variable size chamber wherein the flow is from the variable size chambers to the reservoir and the flow is from the sump to the variable size chambers regardless of whether the level of the body of water is rising or falling.

19. A tide activated system for deriving energy from the periodic rise and fall of the level of a body of water, the system comprising:

a lagoon in communication with the body of water by a channel, the lagoon having a perimeter sea wall enclosing the lagoon and a central sea wall positioned in the lagoon and connected to the perimeter sea wall by a causeway, wherein the central sea wall is interposed between the channel between the lagoon and the body of water and the float/weight barge;

a plurality of float/weight barges carried in the lagoon for rising and falling with the level of the body of the water, each of the float/weight barges having
- at least two cylinders in series, each cylinder having a chamber, the chamber holding a piston movable in the chamber defining a pair of variable size chambers;
- a shaft extending through the chambers, the shaft extending through and connected to the pistons for moving the pistons within the chamber of the respective cylinder for varying the size of the pair of variable size chambers of the at least two cylinders;
- a cable guide system having a series of pulleys; and
- a buoyancy and weight system for maintaining stability of the float/weight barge as the float/weight barge rises and falls in the lagoon;

an outboard beam extending from the central sea wall to the perimeter sea wall, the outboard beam parallel to the causeway wherein the float/weight barges are positioned between the outboard beam and the causeway;

a pumping cable system extending between the causeway and the outboard beam and interacting with at least a pair of pulleys of the cable guide system, the pumping cable system including the shaft extending through the chamber, wherein the movement of the float/weight barge in the rising and falling lagoon moves the piston in each of the cylinders varying the size of the pair of variable size chambers;

a stabilizing cable system extending between the outboard beam and the causeway and interacting with at least a pair of pulleys of the cable guide system, wherein the stabilizing cable system in cooperation with the pumping cable system maintains the float/weight barge in generally a horizontal plane as the float/weight barge rises and falls in the lagoon;

a working fluid;

a working fluid compensation system including:
- a reservoir for retaining the working fluid, the reservoir located at a higher elevation than the lagoon;
- a turbine generator for generating electrical power, the turbine generator at an elevation below the reservoir and above the lagoon, the turbine generator having a working fluid input port, a working fluid output port, and a series of blades for interacting with the working fluid for converting the energy from the working fluid into electrical energy;
- a sump at an elevation below the turbine generator and above the lagoon for holding working fluid from the turbine generator;
- a flow control system for directing water forced from the variable size chamber that is decreasing in size as the barge rises or falls in the lagoon to the reservoir and directing water from the sump to the variable size chamber that is increasing in size as the barge rises or falls wherein the rise and fall of the level of the body of water results in the rise and fall of the barge therein moving the piston back and forth in the cylinder forcing fluid out of one side of the variable size chamber and then the other side of the variable size chamber as the other side is filled, the flow control system-directing the water.

20. A motion-activated system for deriving energy from the periodic rise and fall of the level of a body of water, the system comprising:
- at least one float/weight barge for rising and falling with the level of the body of water,
  each of the float/weight barges having:
  - a cylinder having a chamber, the chamber holding a piston movable in the chamber defining a pair of variable size chambers;
  - a shaft extending through the chamber, the shaft extending through and connected to the piston for moving the piston within the chamber of the cylinder for varying the size of the pair of variable size chambers of the cylinder;
  - a cable guide system having a series of pulleys; and
  - a buoyancy and weight system for maintaining stability of the float/weight barge as the float/weight barge rises and falls;
  - a pumping cable system interacting with at least a pair of pulleys of the cable guide system, the pumping cable system including the shaft extending through the chamber, wherein the movement of the float/weight barge in the rising and falling water moves the piston in the cylinder varying the size of the pair of variable size chambers; and
  - a working fluid;
  - a mechanism for converting the motion of the mechanism for rising and falling to a non-uniform motion in one direction;
  - a mechanism for accumulating energy from the mechanism for converting the motion; and
  - a mechanism for converting the accumulating energy to another form of energy.

21. A motion-activated system of claim 20 wherein:
the mechanism for converting the accumulating energy to another form of energy is a turbine generator having a working fluid input port, a working fluid output port, and a series of blades for interacting with the working fluid for converting the energy from the working fluid into another form of energy;
the mechanism for converting the motion of the float/weight barge to a non-uniform motion in one direction is a flow control system for directing working fluid forced from the variable size chamber that is decreasing in size as the barge rises or falls towards the turbine generator and directing water from the turbine generator to the variable size chamber that is increasing in size as the barge rises or falls wherein the rise and fall of the level of the body of water results in the rise and fall of the barge therein moving the piston back and forth in the cylinder forcing fluid out of one side of the variable size chamber and then the other side of the variable size chamber as the other side is filled; and
the mechanism for accumulating energy from the mechanism for converting the motion is a working fluid compensation system including:
- a reservoir for retaining the fluid from the cylinders, the reservoir located at a higher elevation than the turbine generator;
- a sump at an elevation below the turbine generator and above the float/weight barge for holding the fluid from the turbine generator, where the turbine generator is at an elevation below the reservoir and above the sump; and
- the turbine generator, the flow control system; and the variable size chambers.

22. A motion-activated system of claim 20 wherein:

the mechanism for converting the accumulating energy to another form of energy is a hydraulic motor coupled to a turbine generator, the hydraulic motor having a working fluid input port, a working fluid output port, and a series of blades for interacting with the working fluid for converting the energy from the working fluid into another form of energy;

the mechanism for converting the motion of the float/weight barge to a non-uniform motion in one direction is a flow control system for directing working fluid forced from the variable size chamber that is decreasing in size as the barge rises or falls towards the hydraulic motor and directing water from the hydraulic motor to the variable size chamber that is increasing in size as the barge rises or falls wherein the rise and fall of the level of the body of water results in the rise and fall of the barge therein moving the piston back and forth in the cylinder forcing fluid out of one side of the variable size chamber and then other side of the variable size chamber as the other side is filled; and the mechanism for accumulating energy from the mechanism for converting the motion is a working fluid compensation system including:
   a pneumatic accumulator for retaining the working fluid from the cylinders at pressure;
   a check valve interposed between the pneumatic accumulator and the flow control system;
   a sump at an elevation above the float/weight barge for holding the fluid from the hydraulic motor; and
   the hydraulic motor, the flow control system; and the variable size chambers.

23. A motion-activated system of claim 20 wherein:

the mechanism for converting the accumulating energy to another form of energy is a hydraulic motor coupled to a first transmission and a second transmission coupled a generator, the hydraulic motor having a working fluid input port, a working fluid output port, and a series of blades for interacting with the working fluid for converting the energy from the working fluid into another form of energy;

the mechanism for converting the motion of the float/weight barge to a non-uniform motion in one direction is a flow control system for directing working fluid forced from the variable size chamber that is decreasing in size as the barge rises or falls towards the hydraulic motor and directing water from the hydraulic motor to the variable size chamber that is increasing in size as the barge rises or falls wherein the rise and fall of the level of the body of water results in the rise and fall of the barge therein moving the piston back and forth in the cylinder forcing fluid out of one side of the variable size chamber and then other side of the variable size chamber as the other side is filled; and the mechanism for accumulating energy from the mechanism for converting the motion is a fly wheel system including:
   a fly wheel;
   the hydraulic motor and a first transmission for inputting non-uniform motion from the working fluid into rotational kinetic energy in the fly wheel; and
   the second transmission and the generator for extracting uniform rotational kinetic energy in the fly wheel and converting to another form of energy.

24. A motion-activated system of claim 20 wherein:

the mechanism for converting the accumulating energy to another form of energy is a hydraulic motor coupled to a first transmission and a second transmission coupled to a generator, the hydraulic motor having a working fluid input port, a working fluid output port, and a series of blades for interacting with the working fluid for converting the energy from the working fluid into another form of energy;

the mechanism for converting the motion of the float/weight barge to a non-uniform motion in one direction is a flow control system for directing working fluid forced from the variable size chamber that is decreasing in size as the barge rises or falls towards the hydraulic motor and directing water from the hydraulic motor to the variable size chamber that is increasing in size as the barge rises or falls wherein the rise and fall of the level of the body of water results in the rise and fall of the barge therein moving the piston back and forth in the cylinder forcing fluid out of one side of the variable size chamber and then other side of the variable size chamber as the other side is filled; and the mechanism for accumulating energy from the mechanism for converting the motion is a working fluid compensation system including:

the mechanism for accumulating energy from the mechanism for converting the motion is a dead weight system including:
   a dead weight;
   a drum and a plurality of chains for carrying the dead weight; the hydraulic motor and a first transmission for inputting non-uniform motion from the working fluid into potential energy in the dead weight by the drum and the plurality of chains and
   the second transmission and the generator for extracting the potential energy from the dead weight and converting the potential energy to another form of energy.

25. A motion-activated system for deriving energy from the periodic rise and fall of the level of a body of water, the system comprising:

at least one float/weight barge for rising and falling with the level of the body of water;

a mechanism for converting the motion of the float/weight barge to a non-uniform motion in one direction includes:
   a power drive system interacting with a mast on the float/weight barge, the power drive system including
      a cylinder having a chamber, the chamber holding a piston movable in the chamber defining a pair of variable size chambers;
      a working fluid;
      a shaft extending through the chamber, the shaft extending through and connected to the piston for moving the piston within the chamber of the cylinder for varying the size of the pair of variable size chambers of the cylinder;
   a pumping cable system interacting with the mast, the pumping cable system including the shaft extending through the chamber, wherein the movement of the float/weight barge in the rising and falling water moves the piston in the cylinder varying the size of the pair of variable size chambers; and
   a flow control system for directing working fluid forced from the variable size chamber that is decreasing in size as the float/weight barge rises or falls and directing working fluid from the turbine to the variable size chamber that is increasing in size as the float/weight barge rises or falls;

a mechanism for accumulating energy from the mechanism for converting the motion including a pneumatic accumulator for retaining the working fluid from the cylinders at pressure; and a mechanism for converting the accumulating energy to another form of energy including a hydraulic motor coupled to a generator.

26. A motion-activated system for deriving energy from the periodic rise and fall of the level of a body of water, the system comprising:

at least one float/weight barge for rising and falling with the level of the body of water;

a mechanism for converting the motion of the float/weight barge to a non-uniform motion in one direction includes a power drive system interacting with a mast on the float/weight barge therein rotating a drive pipe in the same direction whether the barge rise or falls wherein the rise and fall of the level of the body of water results in the rise and fall of the barge therein driving the drive pipe in a single direction;

the mast has a rack;

the power drive system includes a plate system;

a drive gear encircling the drive pipe and rotatable relative to the plate system;

a descending water level gear for engaging the rack; a reversing gear for engaging the rack;

a retainer for retaining the ebbing tide gear and the reversing gear, the retainer moving translationally relative to the plate system between an ebb position and a flood position;

an ascending water level gear engaging the drive gear and rotatable relative to the plate system, wherein during the flooding tide, the retainer slides upward relative to the plate system and the flooding tide gear engages the drive gear therein rotating the drive pipe, and during the ebbing tide, the retainer slides downward relative to the plate system and the reversing gear engages the ebbing tide gear which is always engaging the drive gear therein rotating the drive pipe;

a mechanism for accumulating energy from the mechanism for converting the motion; and a mechanism for converting the accumulating energy to another form of energy.

27. A tide-activated system for deriving energy from the periodic rise and fall of the level of a body of water, the system comprising:

a float/weight barge for rising and falling with the level of the body of water;

a cylinder having a chamber, the chamber holding a piston movable in the chamber defining a pair of variable size chambers;

a shaft extending through the chamber, the shaft extending through and connected to the piston for moving the piston within the chamber of the cylinder for varying the size of the pair of variable size chambers of the cylinder;

a cable guide system having at least one pulley;

a pumping cable system interacting with at least one pulley of the cable guide system, the pumping cable system including the shaft extending through the chamber, wherein the movement of the float/weight barge in the rising and falling water moves the piston in the cylinder varying the size of the pair of variable size chambers;

a working fluid; and a turbine having a working fluid input port, a working fluid output port, and a series of blades for interacting with the working fluid for converting the energy from the working fluid into another form of energy, wherein the rise and fall of the level of the body of water results in the rise and fall of the barge therein moving the piston back and forth in the cylinder forcing fluid out of one side of the variable size chamber and then other side of the variable size chamber as the other side is filled.

* * * * *